United States Patent [19]

Haddad

[11] Patent Number: 5,555,441
[45] Date of Patent: Sep. 10, 1996

[54] INTERACTIVE AUDIOVISUAL DISTRIBUTION SYSTEM

[75] Inventor: Joseph C. Haddad, Elizabethtown, Pa.

[73] Assignee: Interim Design Inc., Elizabethtown, Pa.

[21] Appl. No.: 284,846

[22] Filed: Aug. 2, 1994

[51] Int. Cl.⁶ .................................................. H04N 7/173
[52] U.S. Cl. .................................. 455/4.2; 348/7; 348/3
[58] Field of Search ........................... 348/6, 7, 8, 10, 348/12, 13, 1, 3, 5; 455/31, 3.2, 4.1, 4.2, 6.1, 6.2, 6.3, 2; 380/20, 10; 359/109, 113, 114, 115, 123, 124, 125, 135, 136, 137; 358/84, 85, 86; 370/71, 73, 69.1; H04N 7/10, 7/16, 7/173, 7/14, 7/20, 7/22

[56] References Cited

U.S. PATENT DOCUMENTS

| | | |
|---|---|---|
| 3,696,297 | 10/1972 | Otero . |
| 3,757,225 | 9/1973 | Ulicki . |
| 4,008,369 | 2/1977 | Theurer et al. . |
| 4,264,924 | 4/1981 | Freeman . |
| 4,395,780 | 7/1983 | Gohm et al. . |
| 4,450,477 | 5/1984 | Lovett . |
| 4,518,989 | 5/1985 | Yabiki et al. . |
| 4,520,404 | 5/1985 | Von Kohorn . |
| 4,521,806 | 6/1985 | Abraham . |
| 4,536,791 | 8/1985 | Campbell et al. . |
| 4,567,512 | 1/1986 | Abraham . |
| 4,590,516 | 5/1986 | Abraham . |
| 4,677,467 | 6/1987 | Hayes . |
| 4,740,834 | 4/1988 | Mobarry . |
| 4,755,872 | 7/1988 | Bestler et al. . |
| 4,761,684 | 8/1988 | Clark et al. . |
| 4,763,191 | 8/1988 | Gordon et al. . |
| 4,789,863 | 12/1988 | Bush . |
| 4,885,775 | 12/1989 | Lucas . |
| 4,963,995 | 10/1990 | Lang . |
| 5,371,532 | 12/1994 | Gelman et al. ............................... 348/7 |
| 5,442,389 | 8/1995 | Blahut et al. ................................. 348/7 |
| 5,442,390 | 8/1995 | Hooper et al. ............................... 348/7 |

FOREIGN PATENT DOCUMENTS

| | | |
|---|---|---|
| 0605115 | 7/1994 | European Pat. Off. . |
| 0012599 | 7/1992 | WIPO . |

OTHER PUBLICATIONS

Communications—Rising To The Heights, Denver, Jun. 23–26, 1991, vol. 2 of 3, 23 Jun. 1991 Institute Of Electrical And Electronics Engineers, pp. 842–846, XP 000269608 Gelman A. D. et al 'A Store–And–Forward Architecture For Video–On–Demand Service'.

Computer Networks And ISDN Systems, vol. 26, No. 10, Jul. 1994 Amsterdam NL, pp. 1305–1322, XP 000453512 Ramanathan et al 'Towards Personalized Multimedia Dial–Up Services' See p. 1305, Line 1—p. 1311, right col., line 41, see p. 1313, left col., line 10—p. 1318, left col., line 19, see p. 1319, right col., line 7—p. 1321, right col., line 27 see FIGS. 1–3, 5–8, 11.

Primary Examiner—David E. Harvey
Attorney, Agent, or Firm—Dilworth & Barrese

[57] ABSTRACT

A distribution center according to the present invention is capable of handling requests from a plurality of subscribers for accessing programs in a central audiovisual library. The subscriber requests may specify a variable time allowance interval within which a requested program may be delivered.

31 Claims, 16 Drawing Sheets

FEASIBILITY SCHEDULING

FEASIBILITY SCHEDULING (CONT.)

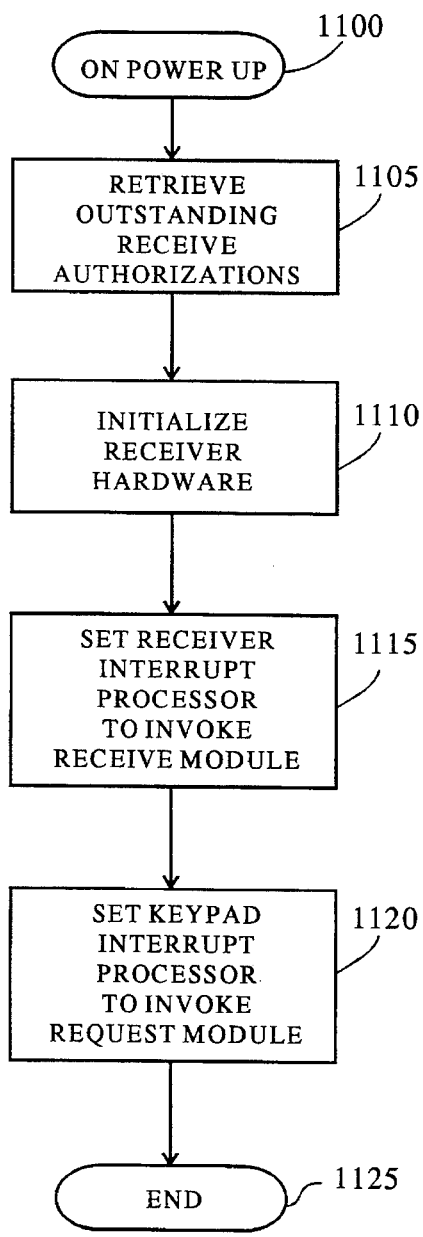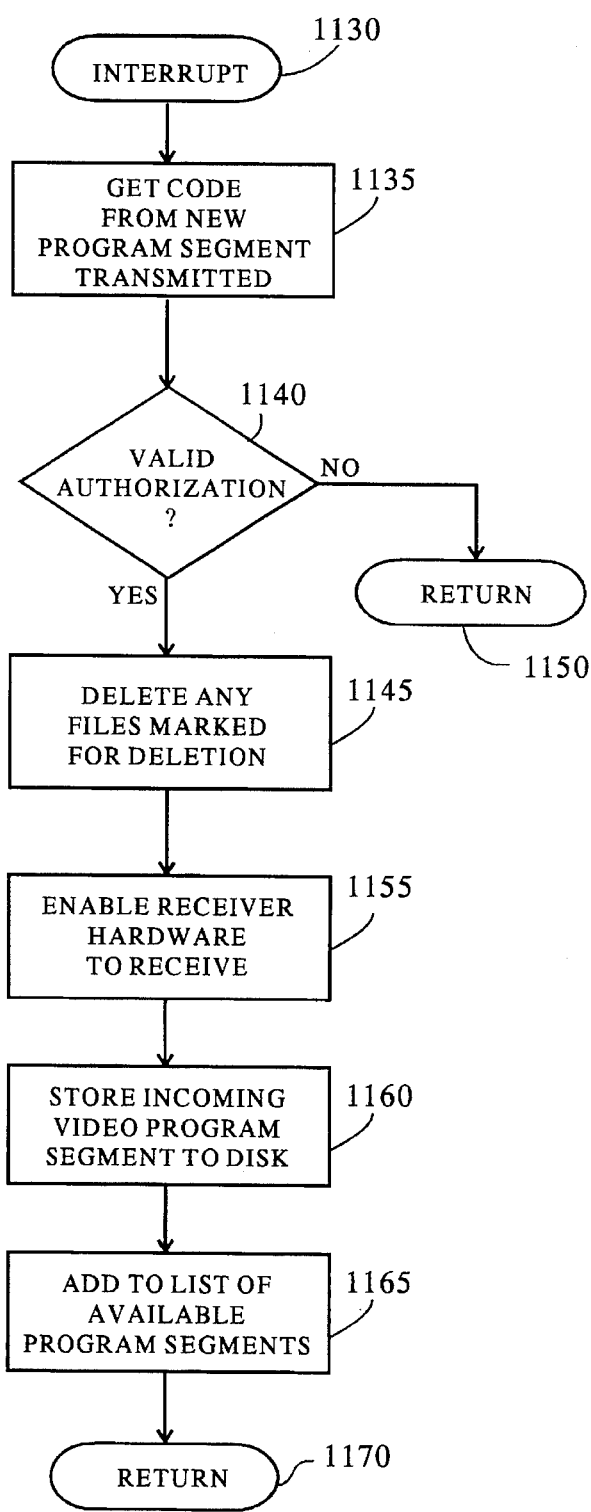
FIG. 11

PROCESS ORDERS (CONT.)

INTERACTIVE AUDIOVISUAL DISTRIBUTION SYSTEM

BACKGROUND OF INVENTION

1. Technical Field

The present invention relates to an interactive communication system that allows a plurality of subscribers to access a central audiovisual library, more specifically, a system capable of handling each subscriber's tailored requests for program segments.

2. Background of Related Art

Systems which provide subscriber access to prerecorded program segments from a distributor center have been described. For example, in a system described in U.S. Pat. No. 4,521,806 to Abraham, a plurality of subscribers are able independently to access segments of a central program library. The requested broadcast segments are digitized and time compressed at the central station. They are then delivered to the requesting subscriber only. The time compressed segments are recorded at the subscriber station by a two-speed recorder. When the transmission of the requested segment is complete, a broadcast signal attached to the end of the broadcast segment causes the two-speed recorder at the subscriber station to playback immediately the transmitted segment. In this system subscriber viewing time is a function of the program delivery time.

In a system described in U.S. Pat. No. 4,751,684 to Clark et. al., each system subscriber is able to request program segments from a distribution center. These segments are then delivered to all system subscribers indiscriminately. Subscriber requests to the center are placed in line in the chronological order in which they are received, and are broadcast in turn on one common channel.

U.S. Pat. No. 4,963,995 to Lang discloses a video recorder/transmitter apparatus that enables a user to receive, compress, edit, and retransmit video program information in either compressed or decompressed format. The apparatus includes memory for mass data storage. The patent proposes the linkage of a plurality of the apparatus to a network transfer system, with one apparatus acting as a distribution center. The above-mentioned U.S. Pat. Nos. 4,521,806; 4,751,684; and 4,963,995 are incorporated herein by reference.

Other recent audiovisual delivery systems include pay-per-view (PPV) and video-on-demand. Both systems offer real time or near instantaneous delivery of subscriber requested video programs in exchange for fees. Both systems emulate an on premise or home video store. But different from a video program rented from a video store, a drawback of these systems is the inability of the subscriber to manipulate the video program, such as rewind, pause, fast forward, etc., while it is being played or delivered. Further, the fees charged to the subscriber requesting the video program are based on the amount of time the subscriber accesses or is on the system. In contrast, a user who rents video programs from a video store may choose to access the program as many times and whenever he chooses without incurring further charges.

Therefore, there exists a need for an audiovisual delivery system that is efficient for the program distributor while accommodating the individual needs of each subscriber. More particularly, a system capable of handling subscriber requests of several time allowance intervals within which program segments will be delivered. The program distributor accumulates like orders and has the option and capability to fill each of these like orders simultaneously. The subscriber is subsequently able to manipulate and view segments or an entire delivered program.

SUMMARY OF THE INVENTION

To achieve these goals the system according to the present invention provides for subscribers not only to have unlimited access to a program library, but also to select variable time allowance intervals for each program requested. The subscriber is not choosing "yes" or "no" to predetermined times of the day for delivery, as in PPV systems. Instead, by choosing a variable time allowance interval, (s)he is indicating the minimum and maximum amount of time (s)he will wait for the deliver of a request, with those minimums and maximums dependent upon, and beginning with, the time that a request is placed.

The system according to the present invention allows a plurality of subscribers to select any recorded program of a central audiovisual library, without the constraints of a central broadcast menu preselected by the distributor. The system further allows a subscriber to receive and store his selection(s), and to view them subsequently at any time he chooses. Independent viewing by each subscriber is made possible by linking a temporary storage unit with a microprocessor and keypad at each subscriber location. With microprocessor control of the temporary storage unit, the system further allows for a predetermined amount of time that a program request can be viewed by a subscriber, that amount to be determined by the subscriber or the system distributor.

An object of the system according to the present invention is to allow for off-peak delivery of requested programs. The present invention addresses the issues of affordability, efficiency, and subscriber appeal. In most audio-visual distribution systems the greatest consumer demand occurs in the early evening hours. This peak demand taxes the distribution network and may cause distributors to limit consumer choices. The present invention allows the distributor to shift much of the demand away from the peak hours without limiting the consumer to a pre-set or limited menu of programs.

In the present invention the distributor provides the subscriber with several variable time allowance intervals for delivery of requested programs. For example, the distributor can offer "express delivery", that is, within one hour; "one day delivery", that is within a twenty-four hour period; or "long term delivery", within seven (7) days. Each time allowance interval is defined by the maximum amount of time it will take for the order to be filled. Longer term time frames can allow a minimum of time to elapse before delivery. For example, the seven (7) day time frame can be structured so that the program segments will be delivered before the end of seven days, but not before a specified time, for example, twenty-five(25) hours. In this way, the subscriber can anticipate his or her future program selections and place them at a much earlier date without prematurely burdening his own storage capabilities. The system of the invention also allows the subscriber to waive the minimum time before delivery in those instances where his own storage capacity would not be overburdened. If the subscriber, for example, chooses a seven (7) day delivery service, he can waive the twenty-five (25) hours delivery minimum and receive delivery anytime within seven (7) days. The subscriber will choose which of these time frames meets his needs on any given occasion. Product prices will vary accordingly. Pricing strategies will encourage distribution during off-peak hours and thereby utilize the system hardware more fully. Not all program segments need to be available for each interval.

Another object of the present invention is to allow identical orders to accumulate within a given time period. The distributor has the option and the capability of delivering simultaneously all or several requests for the same program segment as long as there is some overlapping time period for the associated time allowance intervals as defined by the various requests. The feature of allowing order accumulation provides maximum efficiency and flexibility for the distributor. The distributor is able to use the variability of the time intervals as a basis to employ an optimization strategy. The advantages derived from the optimization include a lower overall cost.

Still another object of the present invention is to provide viewing time independent of transmission (delivery) time. The system described herein enables the subscriber to order and store one or more program segments. At any time after transmission, the subscriber can view the program segment entirely or in part. The number of viewing times may be limited to a predetermined number, except in those cases where the subscriber has purchased the program segment through the system.

BRIEF DESCRIPTION OF THE DRAWINGS

Other objects, features and advantages of the present invention will become more readily apparent from the following detailed description of the preferred embodiments and the accompanying drawings:

FIG. 11 shows flow diagrams for a start-up module and receive module;

DETAILED DESCRIPTION OF THE PREFERRED EMBODIMENTS

Figure 1:
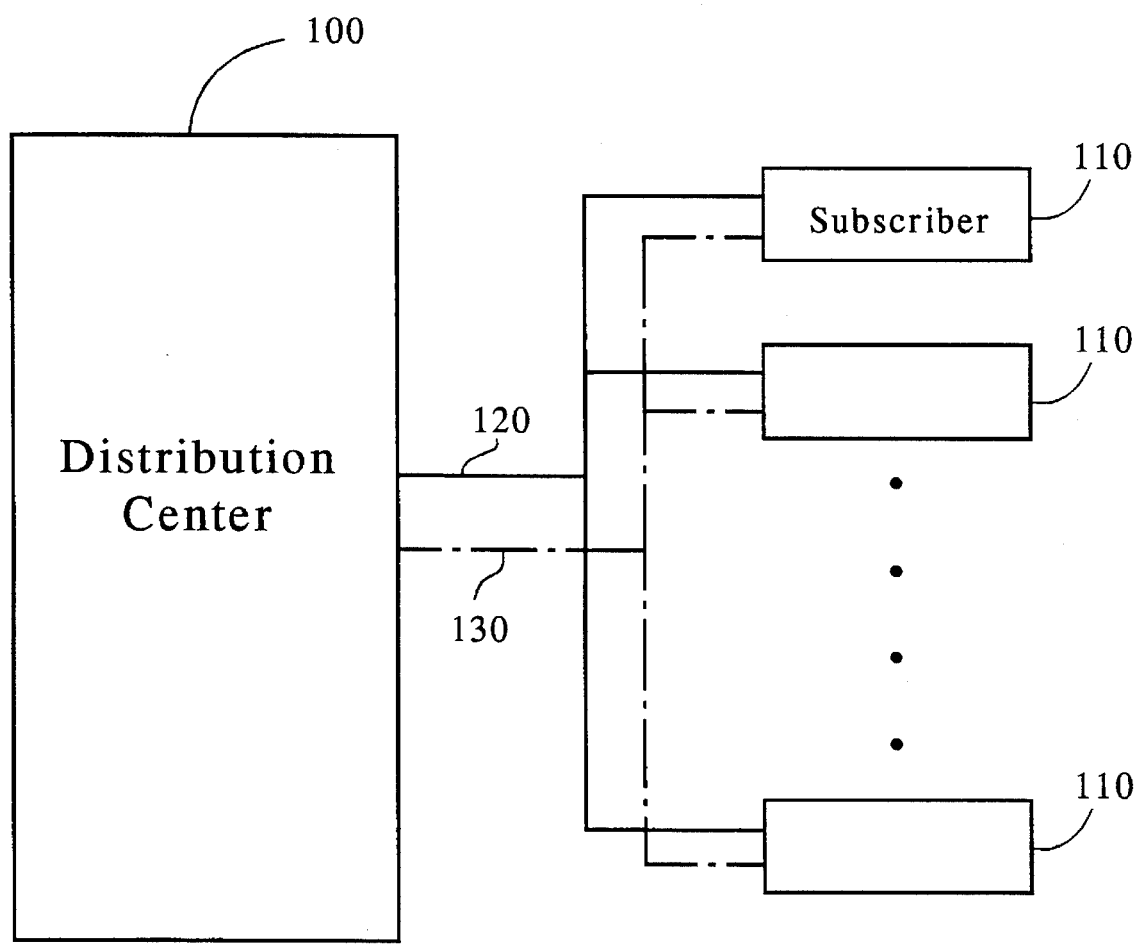
FIG. 1 illustrates the audiovisual distribution system according to the present invention.
Figure 2:
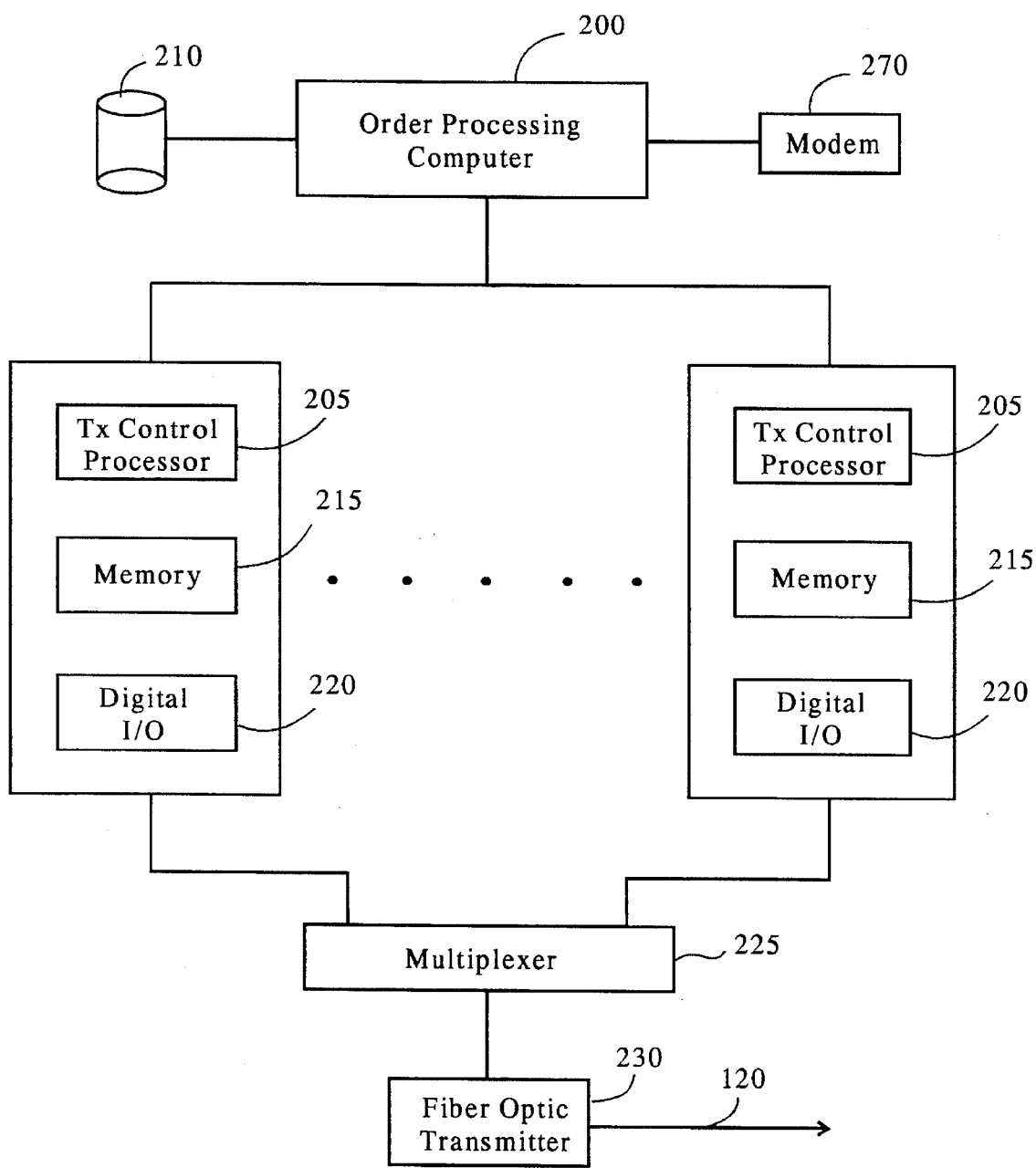
FIG. 2 shows the major component of the distribution center.

Briefly, the system according to the present invention preferably utilizes a compressed digital video technology to provide for transmission of full motion video programs from a central distribution center to individual subscribers which are connected over a communication network.

The system provides high speed communications, preferably 1.544 Mbits/sec or higher, to carry video program segments from a distribution center 100 to a plurality of subscribers 110. The system also provides a low speed bi-directional communication link which can be used for controlling the video transmission. The system can further use high speed dial-up transmission with calls to subscribers originating from the telephone switching center. Permanently connected links are also contemplated.

The high speed link 120, is preferably an optical fiber link for transmission of program data from the distribution center 100. The high speed link 120 may broadcast the same data to all subscribers, much the same as existing CATV systems. The high speed link may also use switching capabilities to facilitate services such as conferencing. It is apparent to one skilled in the art that other known communication techniques including wireless communication can be implemented to accomplish the features of the delivery system according to the present invention. The low speed link 130 is preferably a communication link via modems and dial-up telephone lines. It provides a duplex (two-way) channel for order requests and confirmation. A subscriber terminal 140 at each subscriber location is configured to receive those programs that have been confirmed through the order entry subsystem at the distribution center. The transmission could be encoded to prevent unauthorized reception. Unlike typical computer communication protocols, there is no need for the subscriber terminal to acknowledge whether a data packet has been received correctly. Occasional transmission errors are not critical in full motion video and would not be objectionable. The high speed and the low speed links described above can be combined into one link, such as the Bell System ADSL, for communicating the aforementioned information via a single bi-directional link.

For order entry processing on the other hand, the integrity of the transmitted data is extremely important, and full two-way handshaking is preferred. The amount of data in this case is moderate and relatively low speed. A modem speed of 2400 baud is usually sufficient.

DISTRIBUTION CENTER

The distribution center 100 performs the following major functions:

1. Processes the incoming request for a video program from a customer.
   a) receive incoming calls and establish the (low speed) communication link with a Subscriber Terminal.
   b) provide authorization for the subscriber to receive and/or make a permanent copy of the program.

2. Schedules the video program segments for transmission and determine whether an incoming order can be delivered at the requested variable time allowance interval.

3. Controls the transmission of the video program segments.

4. Maintains customer information and billing records.

5. Maintains the library and catalog of video program segments.

The video programs are preferably available in compressed form and stored on an optical disk. Write Once-Read Many (WORM) or CD-Recordable technology can be used, with the disks stored in a jukebox arrangement. Manual intervention may be necessary to assure that the required program disks are loaded in the jukebox as needed.

Video compression techniques are known. Applicable compression techniques for the present invention include DVI (Digital Video Interactive from Intel Corp.) and the Compressed Digital Video (CDV) technology from Compression Labs, Inc. For an average compression ratio of about 160:1 for VCR quality moving images, a frame of video 512×480 pixels ×3 colors (720 KBytes) can be reduced to 5 KBytes/frame. With a 30 frames/sec rate, the compressed video requires 150 KB/sec. For a 90 minute (5400 sec) video, total storage required is about 810 MB. The CDV technology has a somewhat better image quality but requires 1.5 Mbits/sec (188 KBytes/sec) resulting in a little over 1 BGyte for a 90 minute video. It is anticipated that with MPEG2, high quality video could be provided at 3 to 5 Mbits/sec or studio quality video at 7 to 10 Mbits/sec.

The system of the invention handles incoming orders without interrupting the transmission of the video programs. The distribution center includes multiple processors for video transmission control. Preferably, each processor transmits a separate video program. The transmission scheme can be by ADSL, with a conference call transmitting to multiple subscribers simultaneously. Alternatively, the several programs can be time-division multiplexed onto the optical fiber, providing better utilization of the fiber capacity. In either case each communication line may be serving subscribers in a particular geographic area.

Order Processing

The Distribution Center includes an order processing computer 200 which handles the communication with the subscriber terminals over the low speed modem links 130, processes incoming orders, and maintains the customer information/billing data. Authorization to receive a particular program or to make a permanent copy of a program would be sent back to the subscriber terminals, along with any encryption keys, if necessary, to decode the transmitted program. The order processing computer 200 also determines a schedule for transmitting the video programs and notifies the transmission control processors 205 what programs to transmit and when to transmit them. A display associated with the order processing computer alerts an operator to load program disks into the video library of the appropriate transmission control processor.

The order processing computer 200 includes a standard hard disk (not shown) for storage of customer information and billing data as well as a catalog of video programs. Depending on the number of subscribers and the number of incoming orders anticipated, one or more additional processors may be dedicated to handling telephone communications and some of the order processing functions to off-load the main order processing computer.

An interface bus, preferably IEEE-488 interface bus 215, links the transmission control processors to the order processing computer for initiation of a video program transmission and passing encryption keys. Several transmission control processors can be connected on a single IEEE-488, and more buses could be added as needed.

Video Transmission Control

The primary function of the transmission control processors 205 is to retrieve video program data from the video library 210, provide encryption or other receiver authorization control, and transmit the data over the high speed fiber link 120. The process of transmitting a program is initiated on command from the scheduling function in the order processing computer 200. Several transmission control processors may be transmitting different video programs at the same time using a time-division multiplexing scheme.

The video library 210 includes a set of WORM optical disks or CD-Recordable disks that can be loaded into a jukebox type disk reader. The memory 215, which may also be a jukebox, can hold a number of disks and select the appropriate one for access. The memory 215 holds over 1300 gigabytes of data and can be further expanded if necessary. Other contemplated storage mediums include magnetic tape systems that can automatically select and mount tape reels from an extremely large archive library. A digital I/O board 220 is used to output the video data to the fiber optic transmitter 230. This board provides for a transfer rate of 400 KBytes/sec with Direct Memory Access (DMA). At this data rate, a 90 minute program can be transmitted in a little over a half hour using DVI compression technology. The digital I/O board may be a PDMA-32 which is commercially available from Keithly-Metrabyte, or any substantially equivalent I/O board having similar performance characteristics.

The capacity of the fiber optical link is in the range of 270 Mbits/sec (33 MBytes/sec) to 1 Gbit/sec (125 MBytes/sec). At the lower rate the link is capable of handling about 80 different programs simultaneously. Using a time division multiplexing scheme, packets from different video programs would be intermixed on the fiber link under control of multiplexing logic circuitry 225 interfacing the several transmission control channels to fiber optic transmitter 230. At the subscriber terminals, similar demultiplexing logic circuitry would identify those packets that a particular terminal was authorized to receive and store them in a buffer memory, to be read in via the digital I/O board.

The fiber optic transmitter 230 includes an optical fiber transmitter/receiver module available from Force, Inc., model #2666T-SCXX with data bandwidth of 50 Mb/s to greater than 1 Gb/s at operating range 10 km to 20 km (typical). The module connects to an Advanced Micro Devices TAXI chip set (AM7968/AM7969) which in turn interfaces to the multiplexor 225 described above. The multiplexor 225 can be custom designed using the same technology as the TAXI chip sets.

SUBSCRIBER TERMINAL

Figure 3:
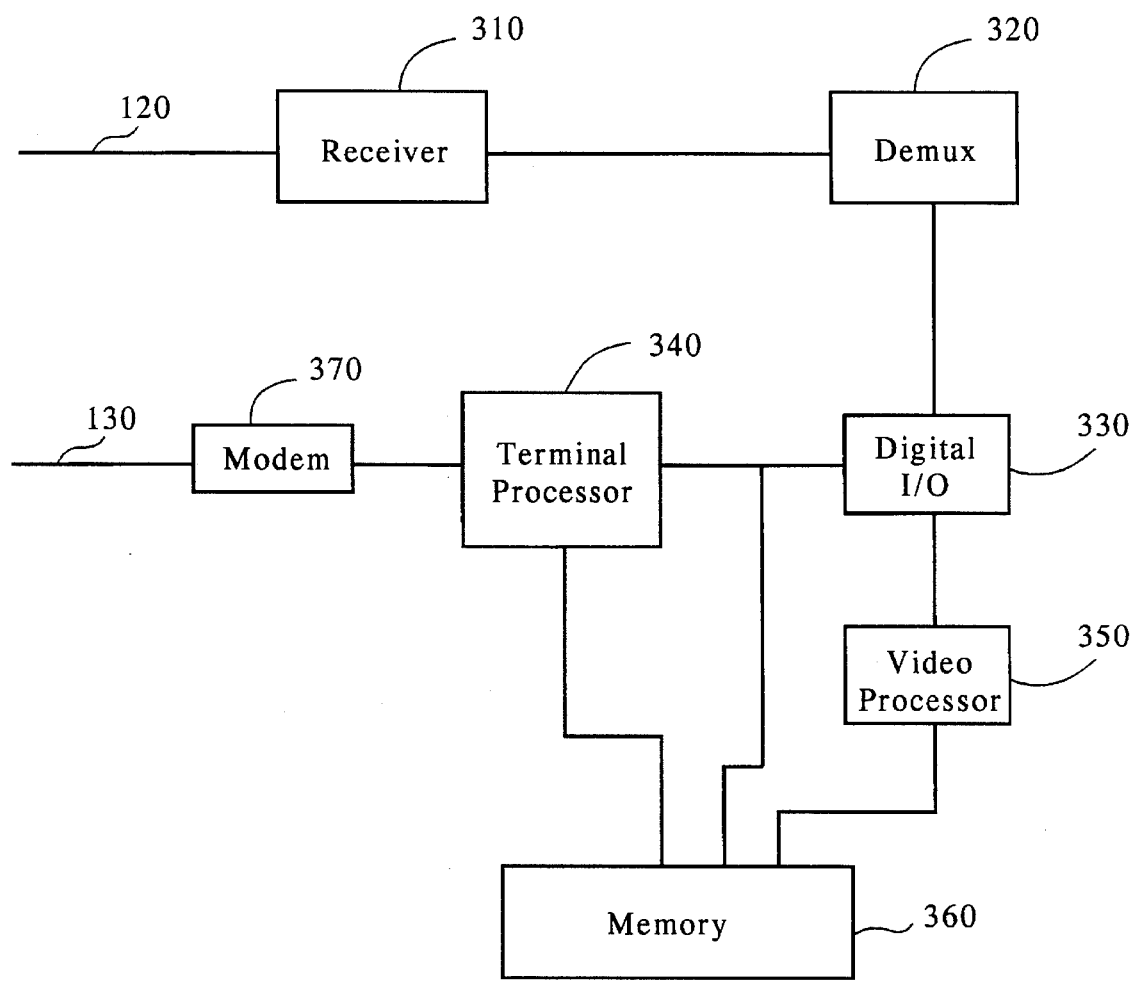
FIG. 3 shows the major components of a subscriber terminal.

The major components of a subscriber terminal 110 are shown in FIG. 3. A receiver 310 is connected to the fiber optic link 120 for receiving the high speed optical transmissions from the Distribution Center 100. The receiver 310 includes a photodiode for detecting the transmitted optical data and converting the optical data to electrical signals. A detector such as a Model #2666R-SCXX, available from Force, Inc., is preferably used. The receiver 310 also includes signal conditioning circuitry for reshaping the detected signals. An AM 7969 TAXI chip, available from Advanced Micro Devices, is preferably used.

A demultiplexer/decoder 320 demultiplexes the received signals previously multiplexed by multiplexor 225 of the Distribution Center 100 and digital I/O board 330 interfaces the demultiplexed data to the video and data distribution circuitry, which includes a terminal processor 340, a video processor module 350 and memory 360. The terminal processor 340 is preferably a personal computer (PC) which includes associated display, modified keyboard (keypad), hard disk memory, and/or WORM or CD-recordable memory. The terminal processor 340 is also connected to telephone link 130 through modem 370 for communicating with the Distribution Center 100 including requesting and receiving authorization for selected program segment orders.

Video processor 350 decompresses the video data received from the digital I/O 330 and provides Red-Green-Blue (RGB) video outputs and Hifi/stereo audio outputs. The video processor 350 may be an Action Media 750 available from Intel. The compressed video program data may be stored on one or more magnetic hard disks for temporary storage and a WORM or CD-Recordable disk for a permanent copy. If more than one hard disk is used, a previously received program could be viewed at the same time that a second program is being received. To store three 90 minute video programs in temporary storage, approximately 2.2 GBytes of memory are required.

As an alternative to temporary storage of video programs at the subscriber terminal, a pool of hard disks located at the Distribution Center could provide real time transmission. These disks would receive program segments from the transmission control processors as requested by subscribers.

Order entry may be selected through a menu driven process using the PC keyboard and monitor. With this approach the keypad would only need a set of number keys plus an ENTER key. The subscriber terminal 110 dials up the distribution center 100 to process orders and to receive the authorization codes and/or encryption keys to receive the program. The program would be stored on the magnetic disk, and if authorization for permanent copy is received, it would be copied to the WORM optical disk as convenient. Programs could be copied from temporary to permanent storage only when authorization is received from the order processing system.

DISTRIBUTION CENTER SOFTWARE

The software architecture for the Distribution Center includes five primary processing modules and preferably five databases. The processing modules are loosely coupled and operate on an event-driven basis. They perform the following general functions of: (1) Order processing—processes the incoming request from a customer; (2) Scheduling—schedules the video program segments for transmission; (3) Transmit—controls the transmission of the video program segments; (4) Customer maintenance/billing—maintains customer information and billing records; and (5) Library maintenance—maintain the library and catalog of video program segments.

The databases are organized as follows:
1. Library—contains the currently available video program segments in compressed format ready for transmission. Each video program segment may be contained on a separate WORM or CD-ROM disk arranged in a jukebox type format.
2. Catalog—list of current titles in the Library database, including pointers to the corresponding library disk volume. For each entry, it contains the program length, the price schedule for the various classes of service, and recent statistics on customer demand (for use in optimizing the transmission schedule).
3. Customer—contains customer information and billing records plus passwords and other information needed to authenticate customer identity on receipt of a dial-in request.
4. Orders—current list of customer orders to be delivered. Identifies the customer by a key into the Customer database and the video segment by a key into the Catalog database.
5. Schedule—current schedule of video program segments to be transmitted. This database further includes:
   a) Feasible schedule—used to determine whether a requested delivery is possible. It is organized by time slot and has each video segment delivered at the last possible moment to satisfy requested variable time allowance intervals.
   b) Optimal schedule—an optimized schedule, organized by hardware delivery channel, showing the video segment currently being transmitted (including start/end times, etc.) and the next segment scheduled on that channel.

Each entry includes receiver authorization codes and keys into the Orders and Catalog databases. A description of each module follows.

Order Processing

Figure 4:
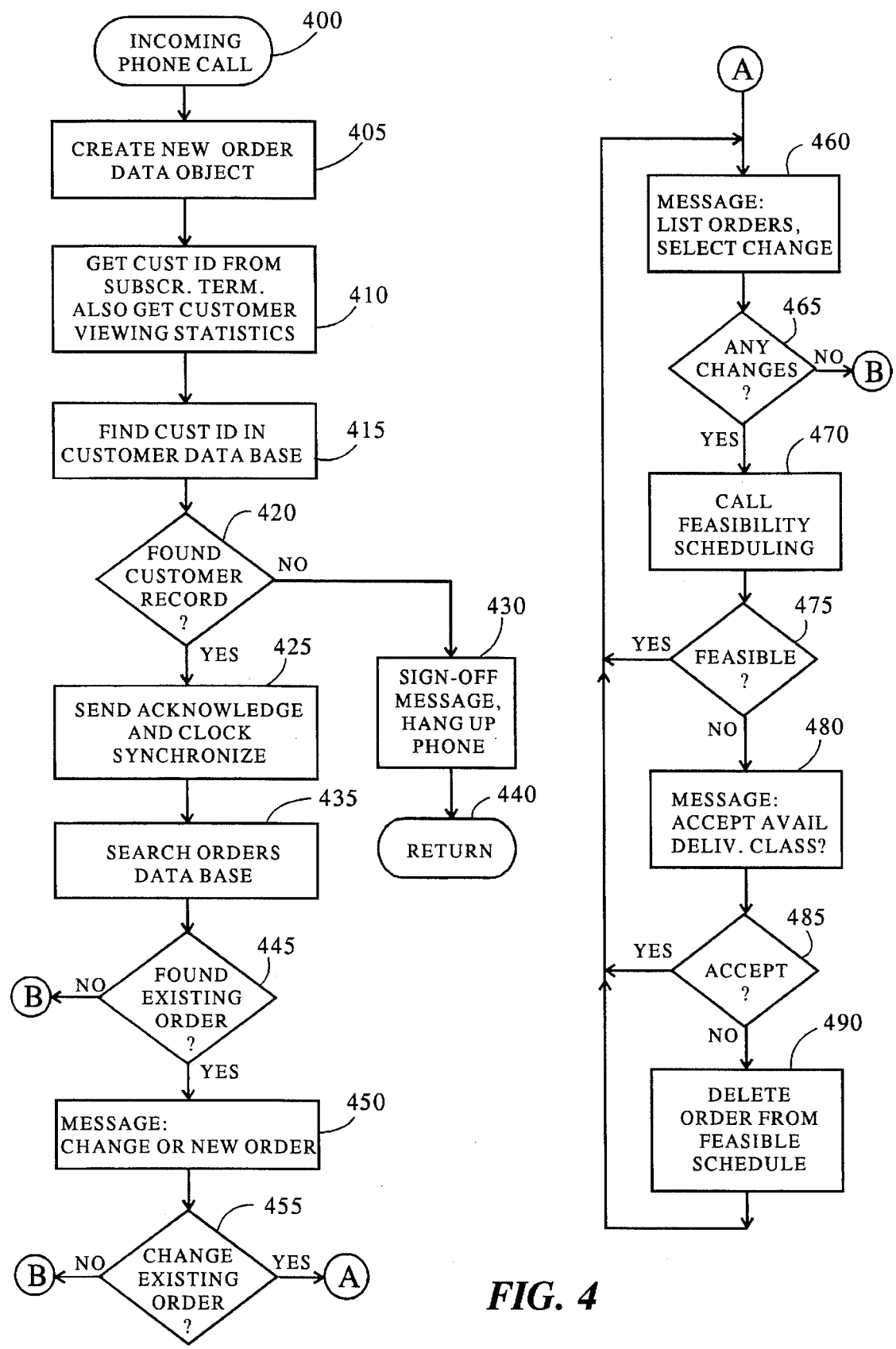
FIGS. 4 and 5 are a flow diagram of an order processing module.
Figure 5:
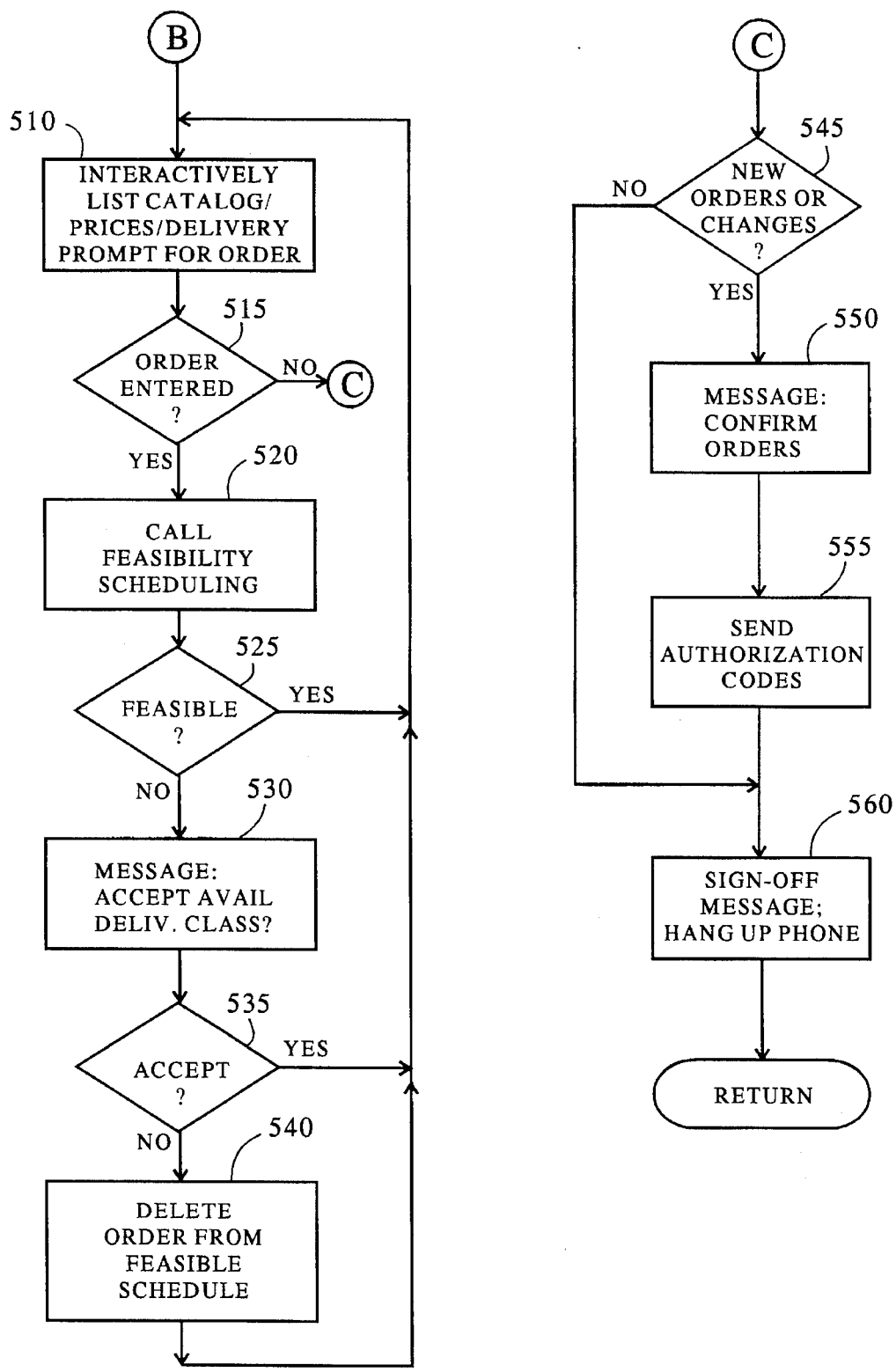

The Order Processing module provides the interface by which the customer enters a request for a video program segment. A representative flowchart of the order processing module is shown in FIGS. 4 and 5 as follows:

On receiving an incoming phone call over a modem (405), the call is answered and a NewOrder data object is created (405) for processing this call. Note that several instances of these data objects may exist at the same time as simultaneous incoming requests are processed. The following functions are performed for each NewOrder data object.

a) Validate the customer by retrieving the customer ID information (410) and checking information in the Customer database (415) and save the key into that database. If the customer cannot be validated (420), send sign off message and terminate call (430).

b) If this customer has an outstanding order (435, 445), prompt over the modem phone link whether an existing order is to be changed or a new order is to be entered (450). If an order is to be changed (455), prompt for the changes interactively and process them (steps 460 to 490). For any changes in variable time allowance interval, the Scheduling module must be called to update the Feasible Schedule (470) and, if a higher variable time allowance interval is requested, to determine whether the delivery is feasible.

c) Prompt the customer for a new order by interactively presenting the list of titles from the Catalog database, along with ordering instructions and pricing (510). If the customer enters an order (515), save the key into the Catalog database for that video program segment and proceed to the next step. Otherwise, go to confirmation and sign off routine(s).

d) Invoke the Scheduling module to verify whether the video program segment can be scheduled in the variable time allowance interval that the customer requested. The Feasible Schedule is also updated at this time (520).

e) If the program segment cannot be scheduled for the requested variable time allowance interval, notify the customer of the highest variable time allowance interval that can be scheduled and ask whether that is acceptable (525, 530). If not acceptable (535), invoke the Scheduling module to delete this order from the Feasible Schedule and go back to step 510 above.

f) Confirmation and sign off routine (545)—send the order confirmation, if any, to the subscriber terminal. This includes the receiver authorization code to allow receipt of the transmission when it occurs and codes to determine how long or how many times the video program segment may be viewed before it is automatically erased. A confirmation message is displayed to the customer (550). Send the authorization codes (555). Preferably, each customer is assigned a unique identification number and at the beginning of each program segment, the ID is transmitted in a data block along with the authorization code and/or decryption code. This technique provides the flexibility to change the mix of customers to receive a particular transmission up to the time the program is actually transmitted.

g) Send sign off message to subscriber terminal and hang up the phone (560).

h) Order processing complete. Delete the NewOrder data object and go to step 400 to wait for a new incoming call.

Scheduling

The Scheduling module has two primary functions: (1) Feasibility—to quickly determine whether it is possible to satisfy a customer's request for a particular video segment at a certain variable time allowance interval so that a pending order can be accepted or rejected. This function is invoked from the Order Processing module whenever a new order or a change to an order is received; and (2) Optimization—uses a rule based approach to select the next program segment to transmit over a channel when the channel becomes free. The technique optimizes the delivery of video segments that have been ordered to efficiently utilize the available hardware channels while meeting variable time allowance interval requirements. This function is invoked just before a hardware channel is to finish transmission of a video segment so that the selection can be made from the current list of orders. For example, orders for the same program segment having overlapping time allowance intervals can be accumulated and accessed at the appropriate delivery time so that the delivery to the requested subscribers can be substantially simultaneous or broadcasted.

For continually processing new orders without interrupting the optimal schedule, each function maintains a separate schedule for its own use as described under Schedule Database section.

The variable time allowance interval may include a minimum delivery time which determines the earliest time that the program segment is to be available for viewing. This is accomplished through the authorization codes, which tell the subscriber terminal when viewing is permitted. The actual transmission may occur early; however, such early transmission should only be allowed when a subscriber indicates that he has sufficient memory to receive the program. If desired, the customer could be made aware that the program segment is available before the minimum waiting period and that an order could be processed to authorize immediate viewing.

When the Feasibility function is invoked, it receives the following information from the Order Processing module:
- Keys into the Orders and Catalog databases
- Program length
- variable time allowance interval requested If the system is split geographically with a separate link(s) for each area, the link that serves each customer must be identified in the Customer database, and the schedule must contain two parts: the schedules for the communication lines and the schedules for the transmission control channels. If the fiber optic link is not geographically split, all subscriber terminals may receive the same transmissions, and the number of control channels should equal the number of program segments that can be multiplexed on the fiber link at any one time. Alternatively, with high speed dial-up transmission capability, each transmission control unit can be connected directly to any number of subscriber terminals, and any number of control units may be used (limited only by the number of different program segments in the library). In either of these cases only the control channels need to be scheduled.

Figure 6:
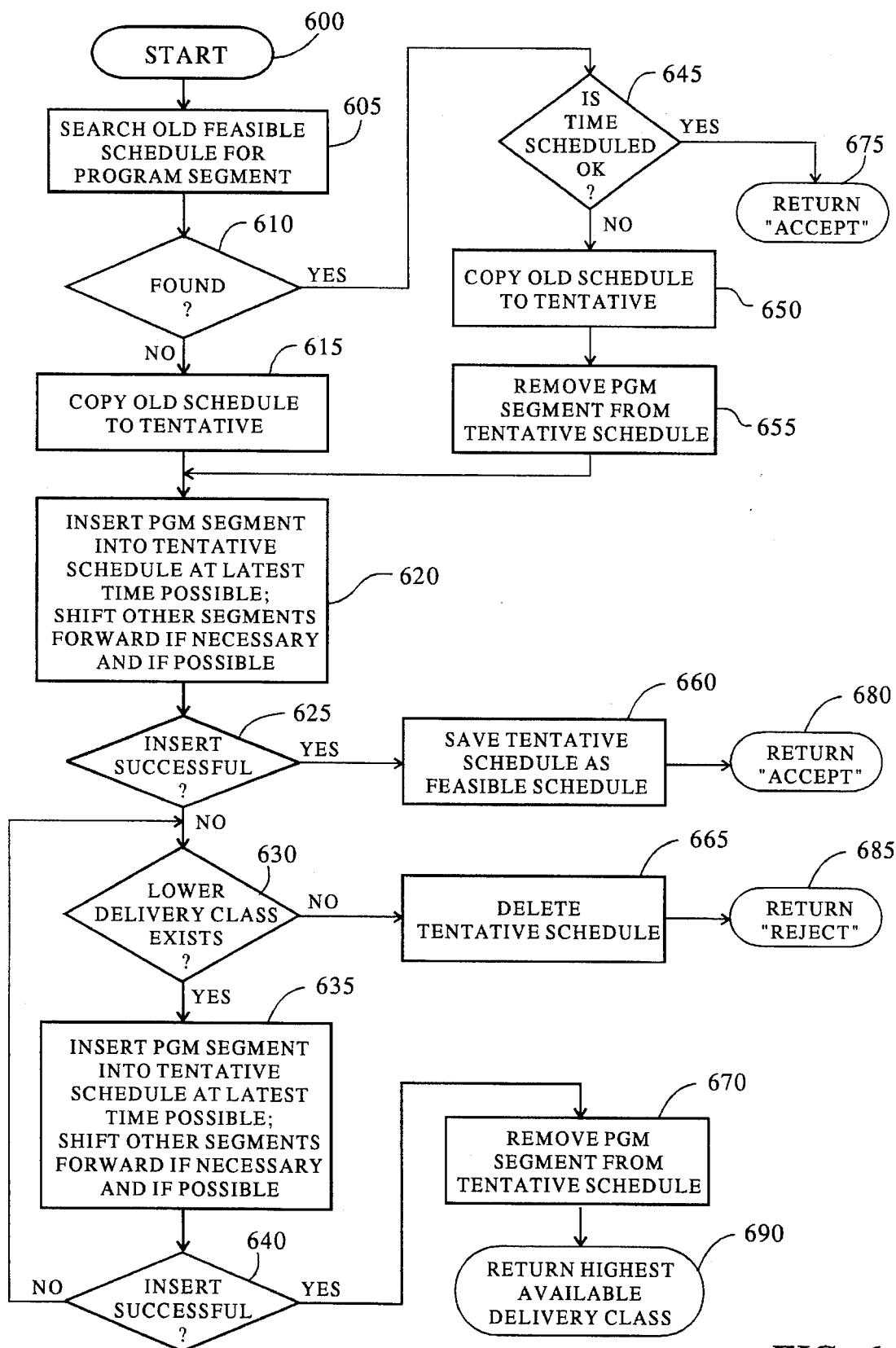
FIG. 6 and 7 are a flow diagram of a feasibility scheduling module.
Figure 7:
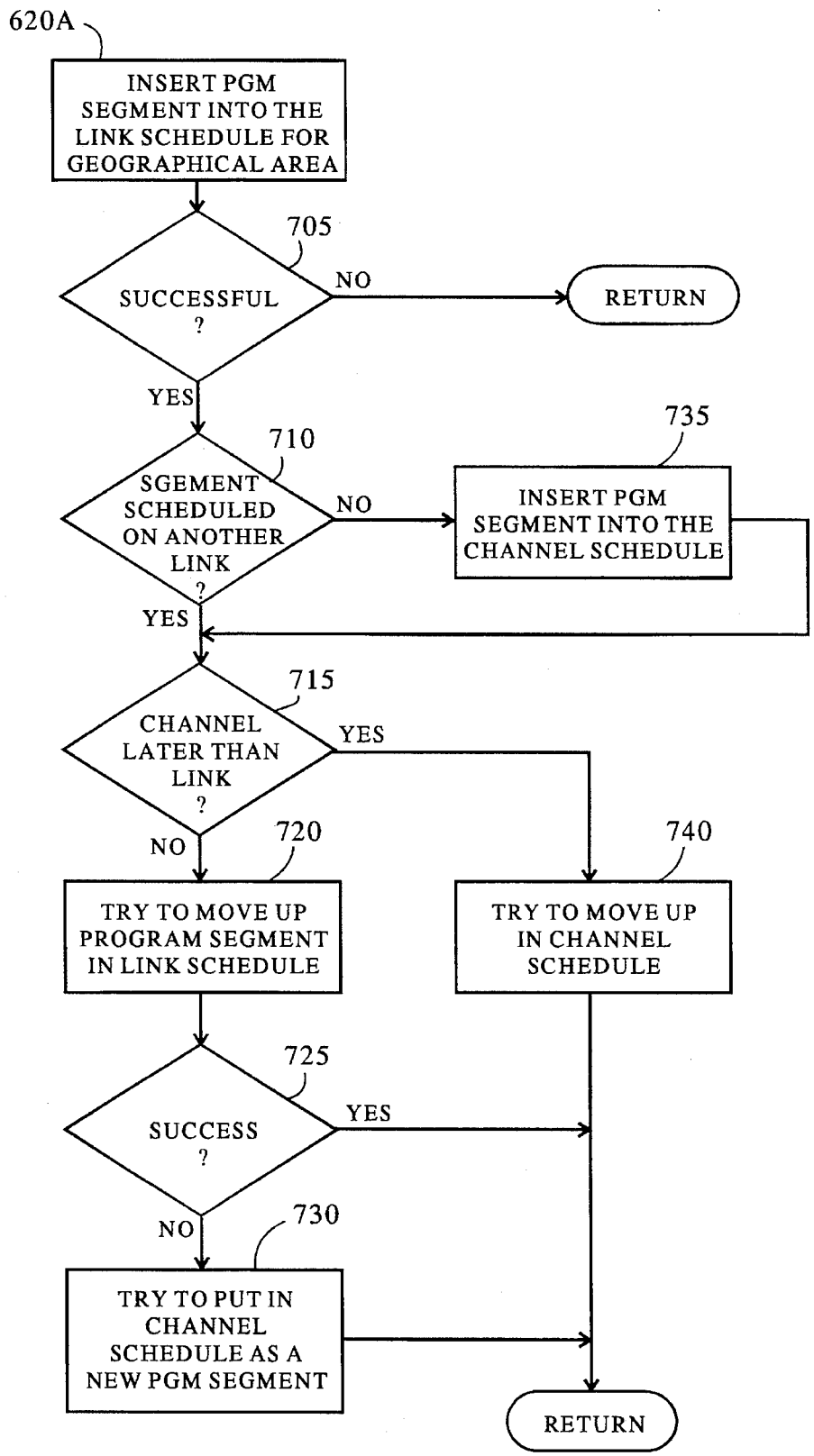

FIGS. 6 and 7 are program flow diagrams of the Feasibility Scheduling process, generally as follows:

Determine the latest time that delivery can be completed for the requested variable time allowance interval;

Search existing Feasible Schedule for the requested video segment (605);

If the video segment is found (610) and if the scheduled time satisfies the requested variable time allowance interval (645) (assuming proper link schedule on a geographically split system), then return a code to Order Processing that the order can be accepted (675). Otherwise copy the current Feasible Schedule into a tentative working schedule (615);

If the video segment is found (610) but the scheduling time does not satisfy the requested variable time allowance interval (645), remove the program segment from the schedule (650, 655). For a geographically split system, remove the program segment from the tentative schedule for the appropriate geographic link;

Insert the program segment into the schedule at the latest possible time. Maintain the latest time order by inserting at the proper location and shifting other segments forward if necessary and if possible. When trying to insert the program segment into the schedule, check for conflict with other program segments for the same customer at the same time, and, if there is a conflict, insert at the latest possible time when there is no conflict (620);

If the insertion was successful (625), save the tentative schedule as the new Feasible Schedule (660) and return a code that the order can be accepted (680);

Otherwise if there is no lower variable time allowance interval (630), delete the tentative schedule (665) and return a code that the offer must be rejected (685);

If a lower variable time allowance interval exists, lower the variable time allowance interval, and try to insert the segment into the schedule (635);

If successful, save the tentative schedule as the new Feasible Schedule (640, 670) and return (690), indicating the highest variable time allowance interval than can be scheduled. Otherwise, go back to step 630.

For a geographically split fiber link system, the insert program segment routine (steps 620, 635) is expanded as shown in FIG. 7, to first schedule (705, 710) the link and then the channel (715 to 730) so that coordination between different links can be effected.

Figure 8:
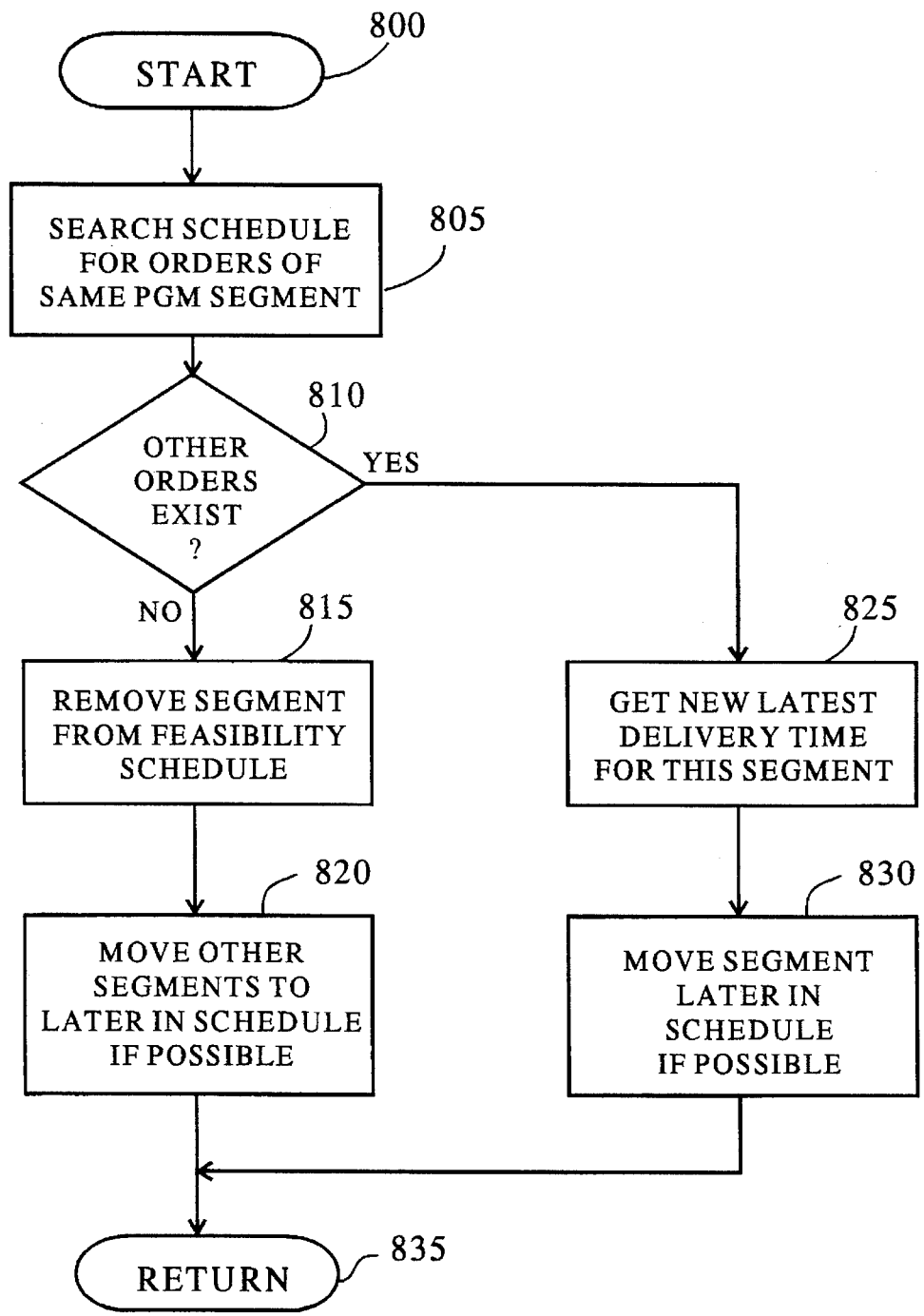
FIG. 8 is a flow diagram of a delete order module.

FIG. 8 is the flow process when the Feasibility function is invoked by the OrderProcessing module to delete an order from the Feasible Schedule. The process include:

Search the Orders database for other orders of this same video segment (805).

If no other order exists (810), then remove the video segment from the Feasible Schedule (815, 820).

If the order exists, get the latest delivery time for the new segment and move segment later in the schedule if possible (825, 830).

Return to the calling program (835).

The Optimization function is invoked (via a timer scheduled by the Transmit module) just before a hardware channel completes delivery of its video segment. Sufficient time is allowed so that the optimization can be completed. The function may also be invoked if the Transmit module finds that the schedule needs to be reoptimized before initiating the transmission of a video segment. This function selects only the next video segment to be transmitted for each hardware channel. It is not practical to try to optimize the complete schedule since new orders would require it to be continually reoptimized.

Figure 9:
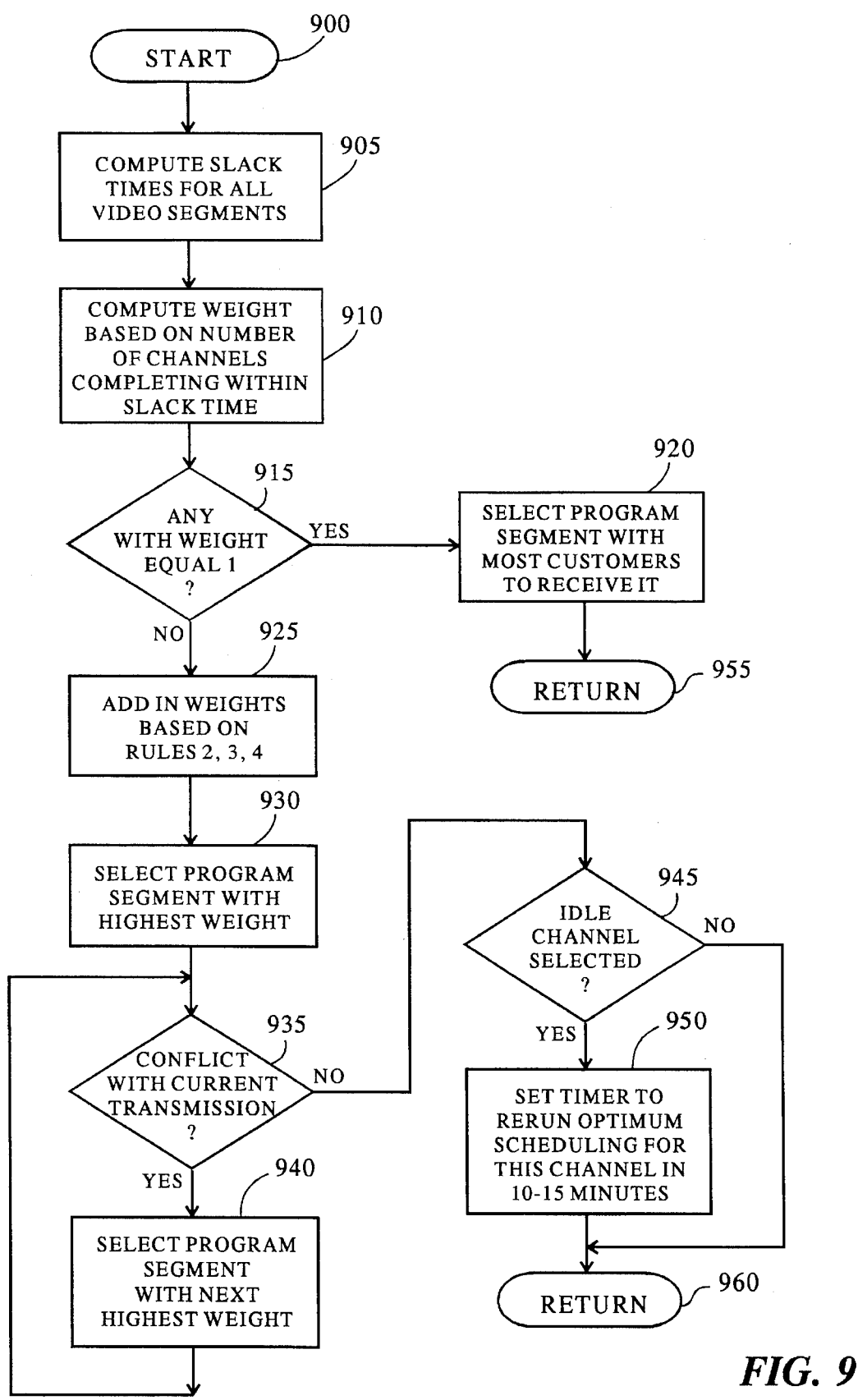
FIG. 9 is a flow diagram of an optimal scheduling module.
Figure 10:
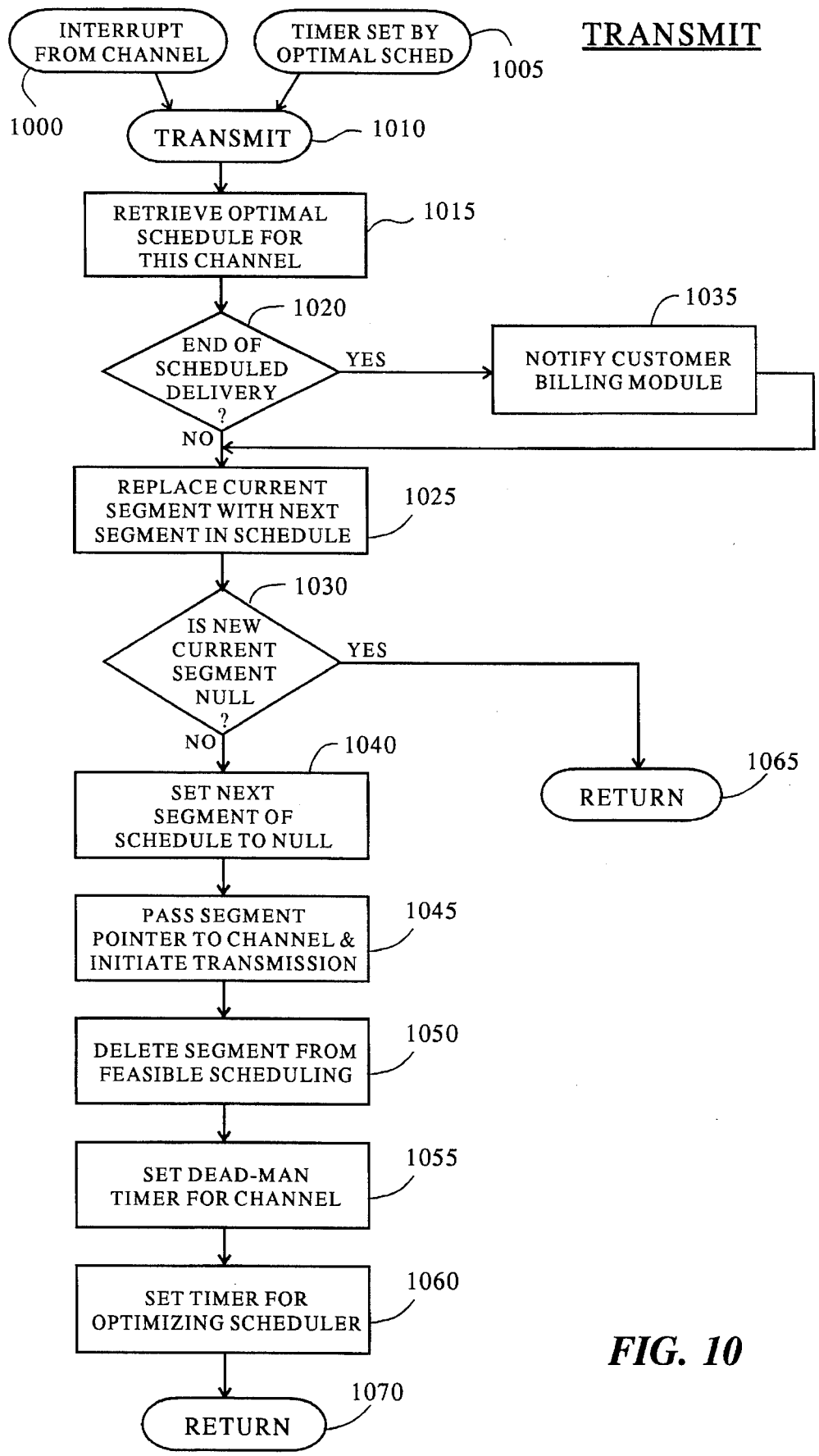
FIG. 10 is a flow diagram of a transmit module.

Referring to FIG. 9, the first step in the processing is to calculate the slack time for each program segment in the Feasible Schedule (905). The slack time is the time remaining before a program segment must be started to just meet its required delivery. It can be obtained directly from the Feasible Schedule; however, if there were a conflict in scheduling two or more program segments at the same time for any customer, then the minimum slack time over all of the conflicting programs is used as the slack time for each of those programs. Next retrieve estimates of the rates at which orders are expected to be placed for each program segment at this day and time, including estimates for express deliveries. These rate estimates can be computed off-line based on recent statistics. The selection of the segment to schedule for next transmission is based on the following factors: (1) Slack time for each program segment to be scheduled; (2) Estimated rate of arrival of orders for each program segment to be scheduled; (3) Estimated rate of arrival of orders for new program segments; (4) Estimated rate of arrival of express orders for new program segments:(5) How much free time is there in the Feasible Schedule; (6) Current channel status, including when each will become free; and (7) If any of the customers receiving a transmission have other program segments on order and, if so, when their current transmission is scheduled to be complete. The selection of which segment is to be transmitted next on a particular open channel is made by applying a set of rules to compute a weight for each segment. This weight ranges from 0 to 1, and the segment with the highest weight is selected for transmission (930). A weight is also computed for the channel to remain idle for a specified time period. The rules for computing the weights are listed below. Weights from the different rules are combined in the manner used to combine certainty factors as described in *Rule Based Expert Systems: The MYCIN Experiments of the Stanford Heuristic Programming Project*, B. G. Buchanan and E. H. Shortliffe, Eds., Addison-wesley, Reading, Mass., 1984, pp. 272–280. The descriptions in these pages are incorporated by reference herein.

1. For each segment find how many channels will complete their current transmission within the slack time. Set the weight for that segment to the reciprocal of that number (910). If the number is one for any segment (915), select that segment immediately and return (920, 955). If there is more than one such segment, choose the one that is to be transmitted to the most customers.
2. For each segment, add a small amount of weight inversely proportional to the estimated arrival rate of orders (925). For the idle channel weight use the rate of arrival of new program orders.
3. Add a small amount of weight to each segment, proportional to the expected arrival rate of new orders up to a preset limit (925). This is to encourage the transmission of existing orders so that channels will be free later to handle new orders.
4. Combine a small amount of negative weight proportional to estimated arrival rate of new express orders up to a preset limit. Add proportional weight to the idle channel weight. The basis for the weight in this case is moderate if there is a large amount of free time in the Feasible Schedule; otherwise, it is small. The large or small decision can be made by applying fuzzy logic. This rule is to encourage leaving some channels free to handle express orders. The program segment with the highest weight is selected (930) and checked against the list of program segments currently being transmitted (935). If there is a conflict, the program segment with the next highest weight is selected (940).

If a channel is to remain idle by the application of these rules (945), a timer is set to poll that channel again in about 10 or 15 minutes (945, 950). The amount of weight to be added in applying these rules (small, moderate, etc.) is for a small weight to be preferably around 0.1 and a moderate weight to be around 0.3. The weights could be updated as operating experience has gained. For example, if the rate of arrival of express orders is less than what has been experienced, the idle channel weight would be reduced.

For the geographically split system, the rules should be applied to the Feasible Schedules for both the channels and the links. An additional rule for coordinating more than one link with a channel would be that once a segment is selected for transmission on a particular link, see if it is also needed on other links. If so, then wait for those links to become available if the wait is not too long and if it doesn't violate the slack time for other segments on the new link.

Transmit

The Transmit module controls the actual transmission of the video program segment. It uses the Optimal Schedule to determine which segment to transmit over a particular hardware channel (steps 1000 to 1045). Keys obtained from the Optimal Schedule (1015) point into the Orders and Catalogue databases, which in turn contain keys into Customer and Library. When transmission of the program segment is complete, the corresponding entries in the Optimal and Feasible Schedules (1050) are deleted and all appropriate Customer records are updated to indicate that delivery has been made (1020, 1035). When transmission of a new video segment is initiated, a timer is set to start up the Optimization Scheduling function (1060) just before delivery is scheduled to complete.

Library Maintenance

This module (not shown) is used to add or remove available program segments to or from the Library and update the corresponding entry in the Catalog. It is initiated by operator selection from the main system menu.

Customer Maintenance/Billing

This module (not shown) is initiated by operator selection from the main system menu. There are two main functional areas that are involved:

Update of all user information including that need to authenticate customer identity.

Generate customer bills from the record of program segment deliveries in the Customer database. Implementation of this module is readily apparent to an ordinarily skilled programmer.

SUBSCRIBER TERMINAL SOFTWARE

Through the PC keyboard and monitor at the subscriber terminal, order entry and program viewing are controlled using a menu selection approach in which a set of options are displayed on the monitor and the customer enters his choice via the keypad. This technique is similar to that currently used for programming a VCR. The keypad need only have a set of numeric keys (0–9) and an ENTER key. If desired a BACKSPACE key could be added to allow for correction of a miskey before ENTERing the selection.

When the customer wishes to make a request, for example to place or modify an order or to view a program segment which he has already received, he presses the ENTER key. The system responds by displaying a menu on the video screen and waits for the customer to enter a response through the keypad by pressing the numeric keys that correspond to the desired menu selection and then pressing ENTER. If a program segment was being viewed on the monitor when the ENTER key was pressed, that program pauses until the customer is finished with the menu selections. On return from the menus, the customer has the option to resume viewing the program, to stop viewing, or to select a different program.

The Subscriber Terminal subsystem is driven by two types of events which generate hardware interrupts: 1) a key being pressed on the keypad and 2) the communications hardware recognizing the start of a video program segment being transmitted over the communication line. Keypad events are handled by the Request module or by a standard keyboard processing routine, depending on the state of the system. The communications event invokes the Receive module, which is responsible for getting the incoming program segment off the communication line and storing it to disk. The Receive module can run in the background in a multi-tasking mode while other processes such as order entry, program viewing, or making a permanent copy are in progress.

The Subscriber Terminal software system consists of seven modules, some of which are subroutines called from the other modules.

Referring to FIG. 11, the Start up- module, which is run when the system is first powered up (1100), retrieves receive authorization codes (1105) and initializes the communications hardware (1110) and then sets up the interrupt processors for the keypad and the communications hardware (steps 1115, 1120).

The receive module is invoked by an interrupt from the communications hardware on the start of transmission of a new program segment (1130). The module first checks whether this Subscriber Terminal has been authorized (1135, 1140) (through the Process Order module) to receive the program segment. If so, the module grabs the incoming blocks of program data from the communication line and stores them to disk (steps 1145, 1155 and 1160). The module continues to run in the background (at high priority) in a multi-tasking mode until all blocks of the program segment have been received. Alternatively, the authorization code may be transmitted to the subscriber terminal as described in the Distribution Center Order Processing module. In that case, the Receive module examines the list of customers in the first block of a program segment to see if it is authorized to receive that program. If so, the authorization code that is sent with that block is extracted to identify which of the subsequent blocks belong to that program segment.

Figure 12:
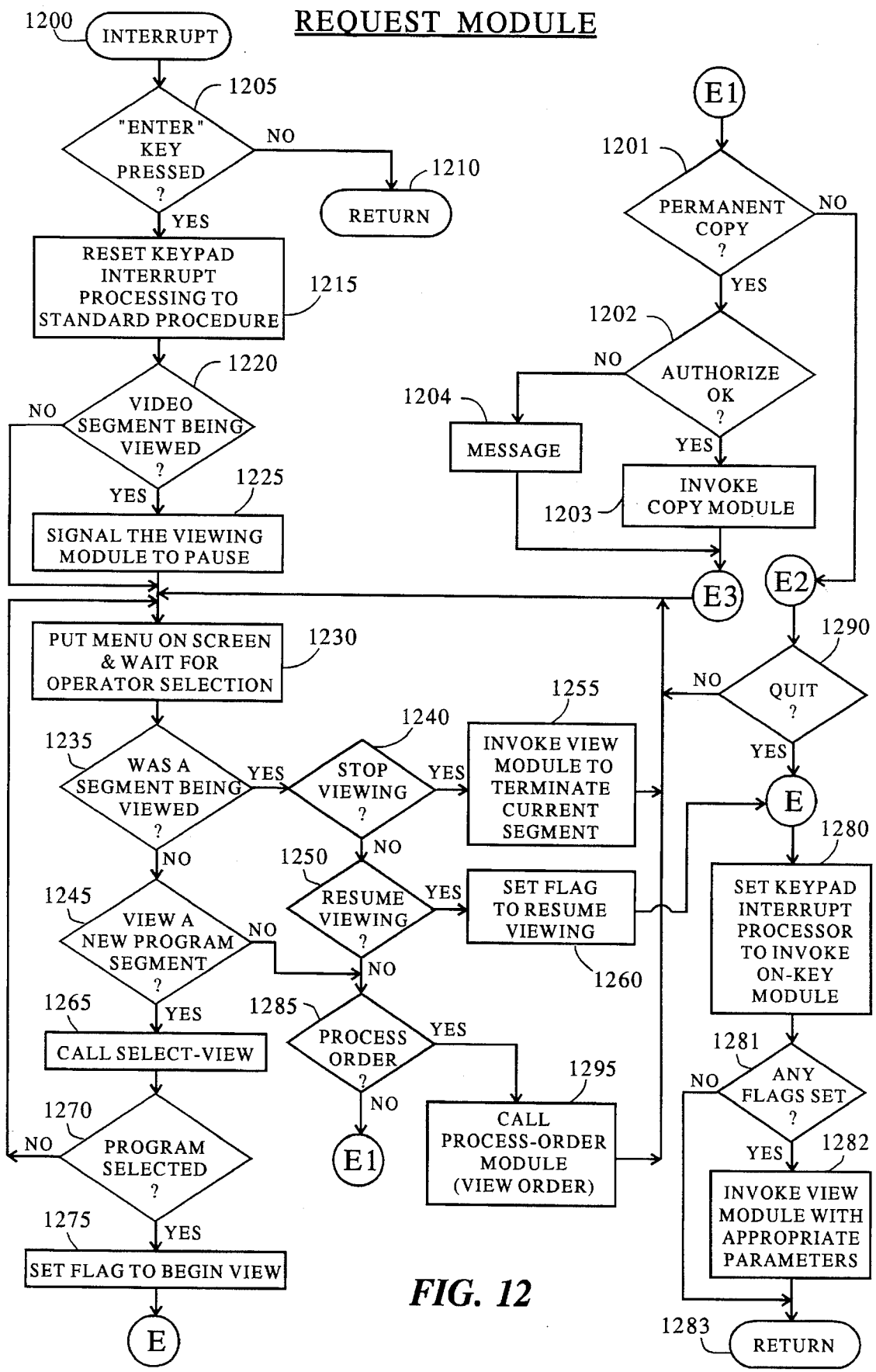
FIG. 12 shows a flow diagram of a request module.

Referring to FIG. 12, the request module, which handles all customer requests which are entered through the key pad (steps 1205, 1210, 1215). First, if a program segment is being viewed, it notifies the View module to pause (1220, 1225). It then displays some basic menus to ask the customer whether he wants to process an order or to view or stop viewing a program segment (steps 1230, 1235, 1240, 1245). Depending on the response, it calls the ProcessOrders (1295) or the SelectView subroutines (1265), each of which presents more menu selections. A more complete description of this module is given below.

Figure 13:
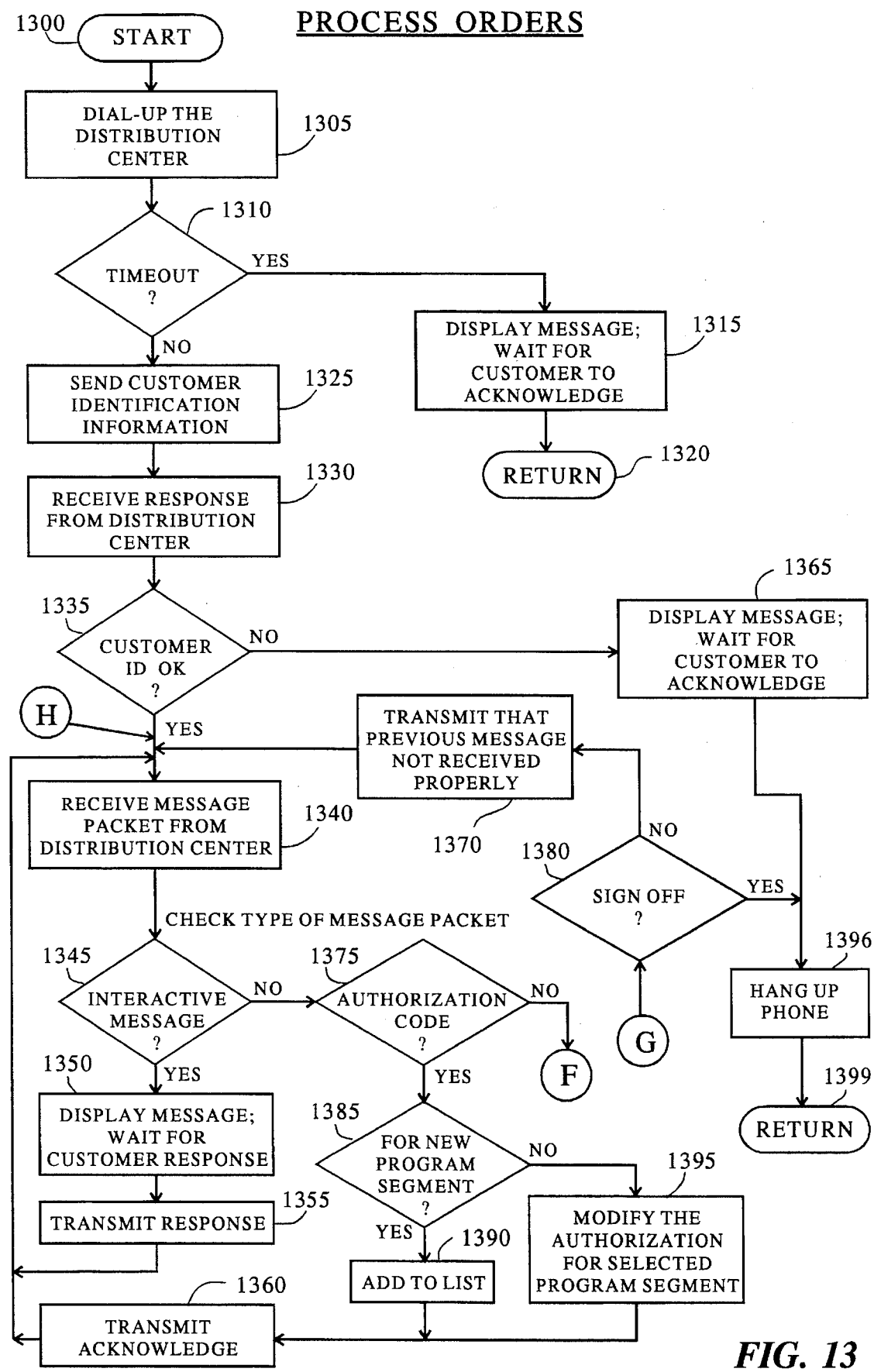
FIGS. 13 and 14 show a flow diagram of a process order module.
Figure 14:
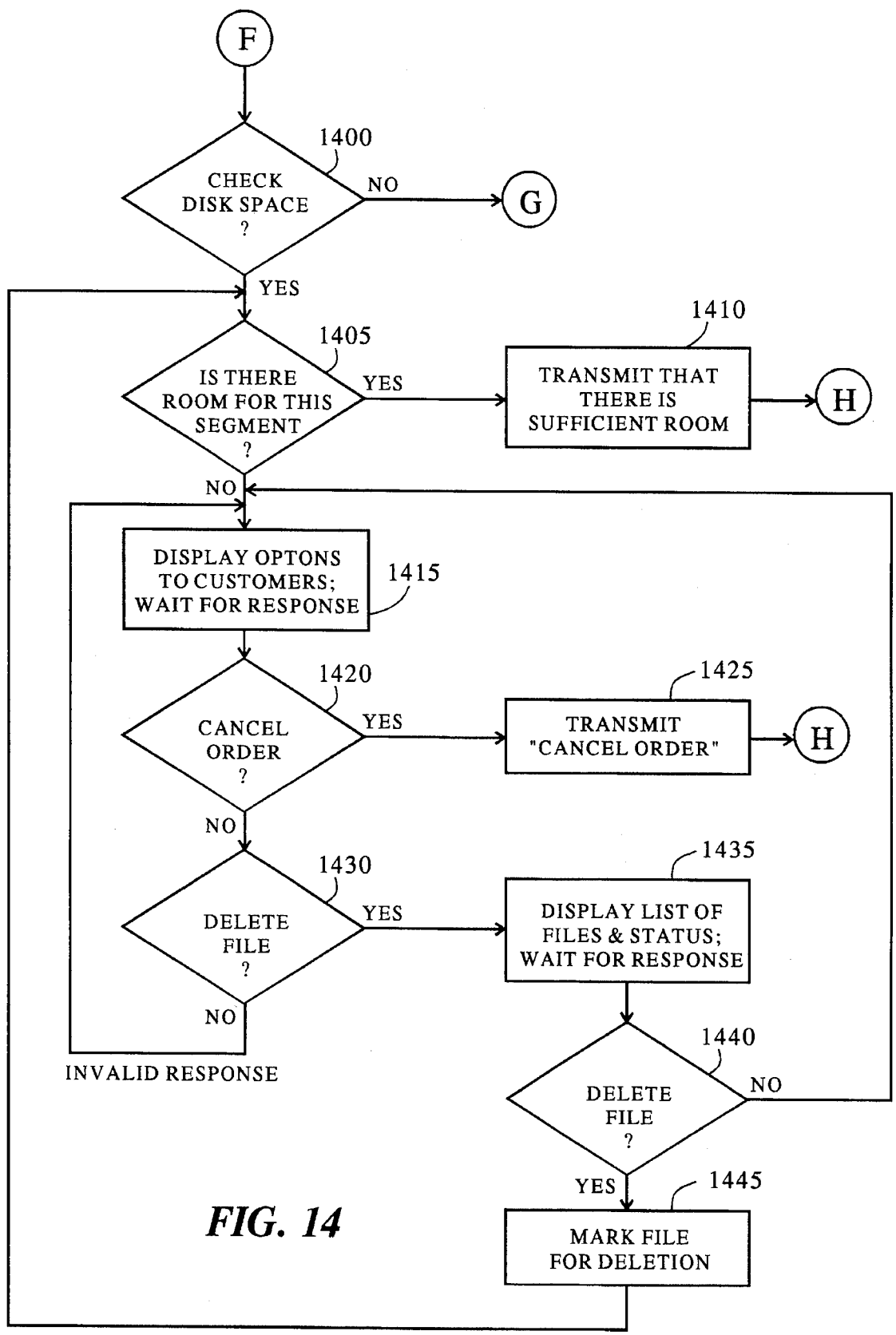

The ProcessOrders routine is shown in FIGS. 13 and 14. This subroutine is called by the Request module or by the SelectView subroutine to interactively communicate with the distribution center. Subscriber orders or requests for extension of viewing time or number can be made through this routine. The subscriber dials up the Distribution Center and interfaces with the Order Processing module (1305). The menus that are displayed by this module are preferably at the Distribution Center and passed as messages over the low speed communication link 130. Upon receipt and verification of the subscriber or customer ID information (1325, 1335), the distribution center sends a menu packet to the subscriber (1340). These menus include lists of available programs, programs currently ordered but not yet delivered, pricing information, etc. The customer enters his response from the keypad and transmits that response back to the Distribution Center (1355). If an order is placed or an existing order is changed, the authorization codes are sent to the Subscriber Terminal. A more complete description of the module is given below.

Figure 15:
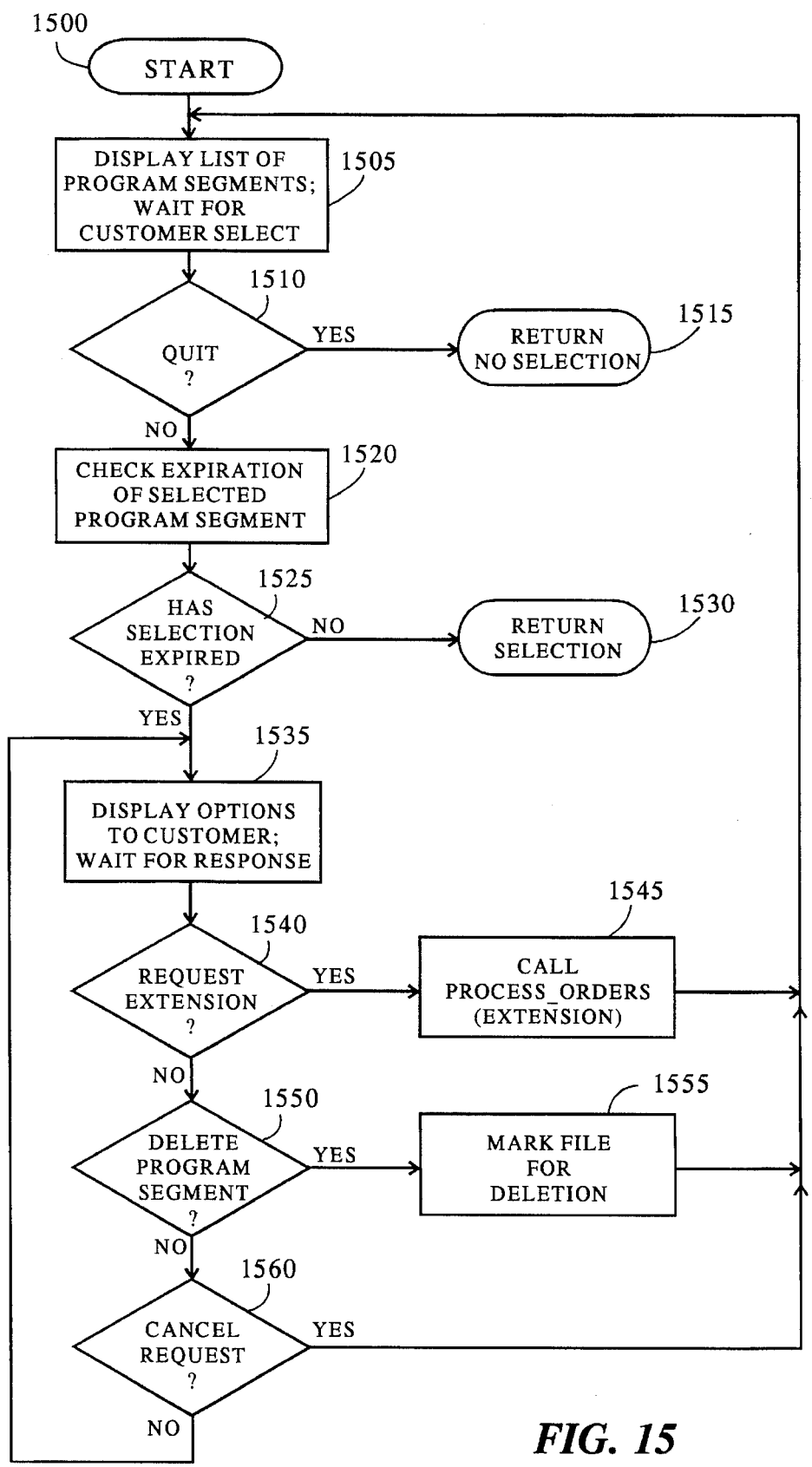
FIG. 15 is a flow diagram of a select view module.

The SelectView module is shown in FIG. 15. This subroutine is called by the Request module to allow the customer to select for viewing any one of the programs segments that are available on the hard drive or the WORM drive at the subscriber terminal. If the selected program segment has expired (either date/time or number of plays), it asks the customer whether the order should be extended. If so, it calls the ProcessOrders subroutine so that authorization can be obtained from the Distribution Center. Otherwise, it asks if the program segment is to be deleted to free up disk space. Note that an expired program is not immediately deleted even though it cannot be viewed. This allows the customer to extend his, authorization without the necessity of retransmitting the program segment. As an alternative implementation, the list of available programs could include those that have been received but not yet authorized for viewing because of the minimum wait time for the selected variable time allowance interval. The customer could be prompted to process an order to receive authorization for immediate viewing.

Figure 16:
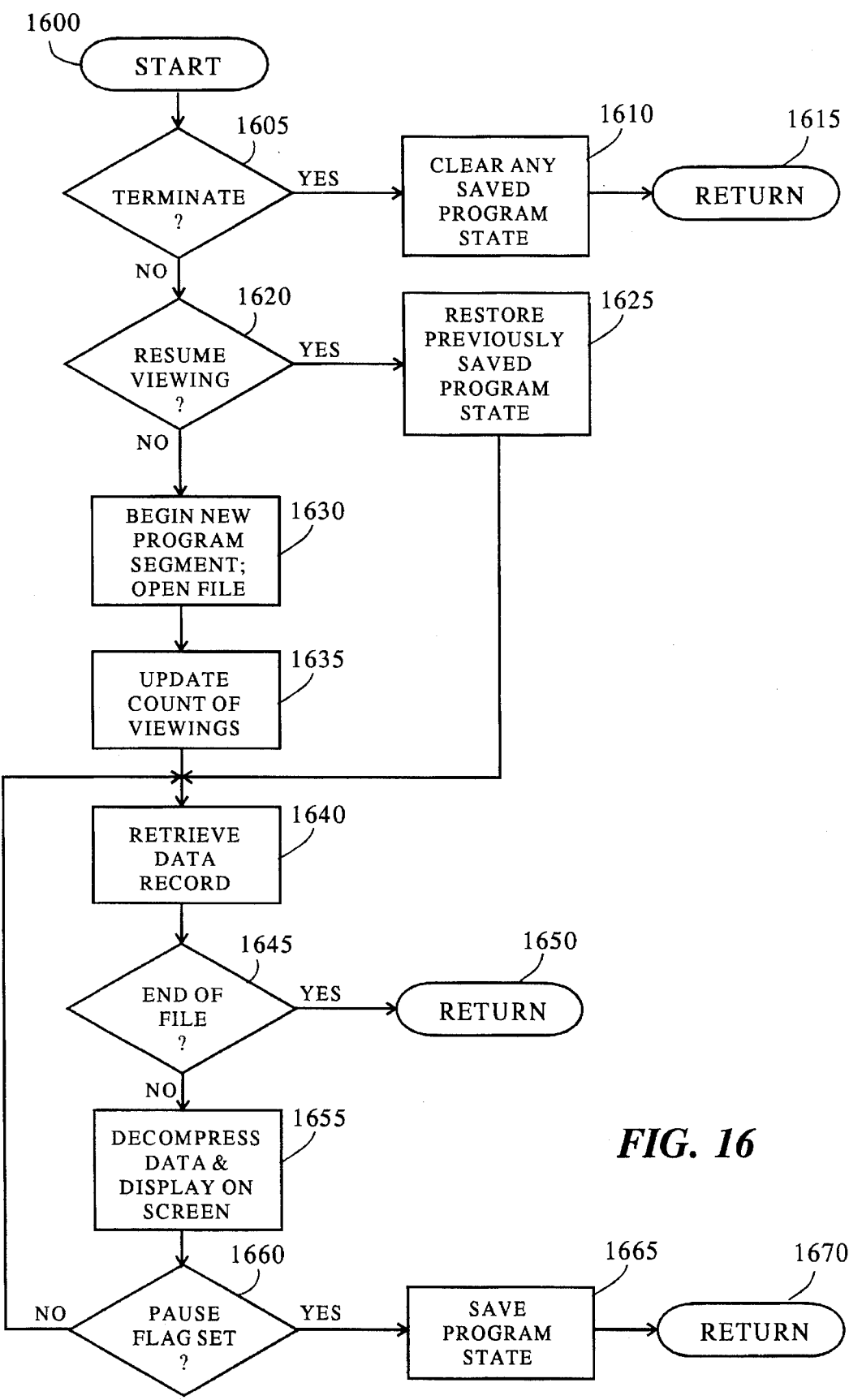
FIG. 16 is a flow diagram of a view module.

The View module is shown in FIG. 16. This module controls the actual viewing of a program segment. It is initiated by the Request module after a selection has been made using the SelectView subroutine. It may run at the same time as the Receive module in a multi-tasking mode. A flag or semaphore set by the Request module is used to tell the View module when to pause in viewing a program. When a pause flag is detected, the current program state is saved so that viewing may be resumed later if desired. A parameter passed to the view module identifies whether to resume a program, to terminate a program, or to start a program from the beginning.

The Copy module copies a program segment from the hard disk to a removable storage medium such as a WORM disk. It executes in the background in multi-tasking mode at a very low priority.

Request module

This module is one of two modules that process hardware interrupts from the keypad. When the system is powered up, the start up module directs that any keypad interrupts be processed by the Request module. All keys but the ENTER key are ignored at this point, causing the module returns immediately. When the ENTER key is pressed, however, the module becomes ready to handle a customer request. It first directs that keypad interrupts be processed by a standard keyboard interrupt processor, which places key presses in a queue where they may be accessed by standard input functions. Next, it checks whether a program segment is currently being viewed, and, if so, it sets the flag in the View module to tell that module to pause, It then displays a menu on the monitor and waits for a response to be entered via the keypad (using standard input routines), The menu options and subsequent actions are as follows:

1. Stop viewing (1240) (only if a program segment was being viewed) invoke the View module to terminate the current segment (1255), The program then is no longer in the pause state, 2. Resume viewing (1250) (only if a program segment is currently in the pause state)
    a) direct the keyboard interrupt processing to invoke this Request module (1280),
    b) invoke the View module with "resume" parameter (1282)
    c) return (1283)

3. Process a new order (1285) (may be selected at any time)

a) call the ProcessOrder subroutine with "new order parameter" (1295)
b) go back to display a new menu on the video screen (1230)
4. View a new program segment (1245) (only if no program is currently in the pause state)
   a) call the SelectView subroutine (1265)
   b) direct the keyboard interrupt processing to invoke this Request module (1280)
   c) invoke the View module with "begin view" parameter (12282)
   d) return (1283)
5. Permanent copy—customer has previously purchased authorization to copy a program segment. to a removable storage medium such as a WORM disk (1201, 1202).
   a) prompt customer to insert disk, wait for response (1203)
   b) invoke the Copy module to copy the program segment to the removable medium in a multi-tasking mode at very low priority; continue execution of this module
   c) go back to display a new menu on the video screen (1230)
6. Quit (only if no program is currently in the pause state)
   a) direct the keyboard interrupt processing to invoke this Request module (1280)
   b) return (1283)

Notice that before returning frog this module, the keypad interrupt processor is set for this Request module.

Process orders subroutine

This subroutine may be called from the Request module or the SelectView subroutine. A parameter is passed to indicate where it is called from. The first step is to dial up the Distribution Center (1305) and establish communication with the Order Processing module there. It sends the customer identification information (1325), including any passwords if desired, and tells whether to process a new order (where this subroutine was called by the Request module) or an extension to an existing order (where this subroutine was called by SelectView). After receiving a validation of the customer identification from the Distribution Center, it waits for a message packet (1335, 0). The message options are shown below with the corresponding actions taken. All keypad entries are processed using standard input routines where a number is followed by ENTER.

1. Interactive messages (1345)—these are the menus constructed by the Distribution Center to be displayed on the video screen
   a) display the message and wait for a response through the keypad (1350)
   b) transmit the response back to the Distribution Center (1355)
   c) go back to wait for another message packet from the Distribution Center (1340)
2. Authorization code for a particular program segment (1375)
   a) if this is for a new order, add the authorization to the list of program segments to be received (1390), transmit an acknowledgement to the Distribution Center (1360), and go back to wait for another message packet
   b) if this is for an existing order that has been placed but not received yet, modify the authorization in the list of program
segments to be received (1395), transmit an acknowledgement to the Distribution Center, and go back to wait for another message packet
   c) if this is an extension to the expiration status for a program segment already received, modify that expiration status (1395), transmit an acknowledgement to the Distribution Center, and go back to wait for another message packet
3. Check disk space (1400)—this code tells the Subscriber Terminal to verify whether there is sufficient disk space to store the requested program segment
   a) If there is sufficient room (1405), transmit an acknowledgment to the Distribution Center, and go back to wait for another message packet (1410)
   b) Otherwise, display a menu with the following options and wait for a response (1415):
      i) cancel order (1420)
         transmit a cancel command to the Distribution Center (1425)
         go back to wait for another message packet
      ii) delete file 1:1430)
         display a list of program segments with their size info & expiration status (1435)
         wait for response
         if a program is selected (1440), delete it (1445) and go back to check if there is sufficient room; otherwise go back to (b) and redisplay the menu.

The system according to the invention is not limited to any specific means or methods of data communication between subscriber and distributor. For example, it is readily apparent to one ordinarily skilled in the art that the distribution of programs can take place over CATV lines, fiber optic lines, or any other adaptable data link. Also without substantive changes, the system can be employed whether the method of distribution is a continuous loop, as in conventional CATV systems, or whether the method uses dedicated or private lines, as in conventional telephone system. Regardless of the type of distribution link, the system provides interactive communication between subscriber and distributor, expanded memory for the subscriber, and a archive of time allowance intervals that provides maximum flexibility for the subscriber and maximum efficiency for the distributor.

I claim:

1. An interactive audiovisual distribution system comprising:
   A. a distribution center having:
      a. a library of stored audiovisual programs;
      b. an order processing computer connected to a plurality of subscriber stations for handling requests for delivery of selected segments of said audiovisual programs from said plurality of subscriber stations, at least one of said requests including a time allowance interval within which a respective one of said selected segments is to be delivered, said order processing computer being coupled to a plurality of transmission control processing units for allocating servicing of said requests to said transmission control processing units; and
      c. each of said transmission control processing units having:
         a transmission control processor for receiving commands from said order processing computer and for handling the distribution of said requested selected program segments;
         a memory for storing audiovisual programs including said requested selected program segments; and
         an interface for coordinating transfer of said requested program segments to subscriber stations corresponding to said requests; and B. each of said subscriber stations including:
- a receiver for receiving said requested program segments from said distribution center;
- a terminal processor having associated memory, input device, and display for generating said requests for delivery of selected segments of said audiovisual programs from said distribution center and for coordinating transfer of said requested program segments delivered from said distribution center; and
- a video processor for decompressing said requested program segments which are in compressed video format.

2. A system according to claim 1 wherein each of said subscriber stations further includes a memory for storing said requested program segments.

3. A system according to claim 1 wherein said order processing computer includes means for prioritizing said requests from said subscriber stations and allocating delivery of programs requested in accordance with said time allowance interval.

4. An interactive audiovisual distribution system comprising:
A. a distribution center having:
  a. a library of stored audiovisual programs;
  b. an order processing computer connected to a plurality of subscriber stations for handling requests for delivery of selected segments of said audiovisual programs from said plurality of subscriber stations, said order processing computer being coupled to a plurality of transmission control processing units for allocating servicing of said requests to said transmission control processing units; and
  c. each of said transmission control processing units having:
    - a transmission control processor for receiving commands from said order processing computer and for handling the distribution of said requested selected program segments;
    - a memory for storing audiovisual programs including said requested selected program segments; and
    - an interface for coordinating transfer of said requested program segments to subscriber stations corresponding to said requests; and
B. each of said subscriber stations including:
  - a receiver for receiving said requested program segments from said distribution center;
  - a terminal processor having associated memory, input device, and display for generating said requests for delivery of selected segments of said audiovisual programs from said distribution center and for coordinating transfer of said requested program segments delivered from said distribution center; and
  - a video processor for decompressing said requested program segments which are in compressed video format; and
C. Wherein said order processing computer of the distribution center includes means capable of delivering requested program segments within a subscriber selected minimum and maximum time period specified in said requests.

5. A system according to claim 1 wherein said order processing computer includes means for interactively communicating information including program segment selection and price with each of said subscribers.

6. A system according to claim 5 wherein said means for interactively communicating includes a modem for facilitating communication over telephone lines.

7. A system according to claim 1 wherein said distribution center further includes a multiplexer for multiplexing a plurality of said transfers of said requested program segments to respective plurality of subscriber stations via a single communication medium.

8. A system according to claim 7 wherein said communication medium is a fiber optic link.

9. A system according to claim 1 wherein said order processing computer further includes means for scheduling delivery of said requested program segments as a function of the rate of arrival of said requests.

10. A system according to claim 1 wherein said order processing computer further includes means for scheduling delivery of said requested program segments as a function of the availability of said transmission control processing units.

11. A system according to claim 1 wherein said order processing computer further includes means for weighing each said requests and scheduling said deliveries in successive weight order.

12. A system according to claim 1 wherein said interface between said distribution center and subscriber station utilizes wireless transmission.

13. A system according to claim 1 wherein said interface between said distribution center and subscriber station is digital.

14. A system according to claim 1 wherein the program segments stored in said memory of said transmission control processing units is in compressed video format.

15. A system according to claim 1 wherein said order processing computer further includes means for optimizing delivery of like orders to requested subscriber stations at substantially the same time.

16. A method of interactive distribution of audiovisual programs from a distribution center to a plurality of subscriber stations, comprising the steps of:
  storing in a library in said distribution center a selection of audiovisual programs;
  receiving requests from said subscriber stations for selected program segments from said selection of audiovisual programs, each of said requests including a time allowance interval within which a respective selected program segment is to be delivered;
  processing said requests;
  accessing said selected program segments from said library; and
  delivering said selected program segments to respective subscriber stations making said requests within respective time allowance intervals.

17. A method according to claim 16, further including the step of selectively varying said time allowance intervals by said respective subscriber stations.

18. A method according to claim 16 further including the step of storing said delivered program segments at said subscriber stations.

19. A method according to claim 16 further including the step of interactively communicating order specifications including changes to said specifications.

20. A method according to claim 16 further including the step of interactively communicating information including program selection and price between said distribution center and said plurality of said subscriber stations.

21. A method according to claim 20 wherein said step of interactively communicating information includes communicating codes to said subscriber station which specify the length of time or the number of times a delivered program segment may be viewed before it is automatically erased.

22. A method according to claim 20, wherein said step of interactively communicating codes to said subscriber stations specifies the earliest time that the delivered program segment is available for viewing.

23. A method according to claim 16 wherein said step of processing said requests includes determining whether to accept or reject subscriber orders based on pending scheduled orders.

24. A method according to claim 16 wherein said step of processing said requests includes monitoring transmission medium availability and scheduling said delivery of program segments in order when said transmission medium is available.

25. A method according to claim 16 wherein said step of processing said requests includes accumulating requests having overlapping time allowance intervals for delivering said program segments substantially simultaneously to respective subscribers.

26. A method according to claim 16 wherein said step of processing said requests includes accumulating requests of same program segments for broadcasting said same program segments to respective subscriber stations.

27. A method according to claim 16, further including a step for optimizing delivery of said requests, including:
   (a) calculating a slack time for each requested program segment;
   (b) comparing the slack times of conflicting program segments;
   (c) selecting the minimum slack time among said conflicting program segments;
   (d) substituting said slack times of said conflicting program segments with said minimum slack time;
   (e) calculating the number of channels which complete delivery of program segments within said slack time; and
   (f) scheduling delivery of the next program segment based upon said slack time and channel availability.

28. A method according to claim 27, further including the steps of:
   (g) retrieving estimates of rates at which orders are expected to be placed;
   (h) scheduling delivery of the next program segment based upon said minimum slack time, said estimate of rates, and channel availability.

29. A method according to claim 16, further including the steps for scheduling the delivery of said requested program segments, based on request weights,
   said weights are computed by:
   (a) reciprocating the number of channels which will complete their delivery within a slack time;
   (b) add a variance which is inversely proportional to an estimated arrival rate of requests;
   (c) add a variance which is proportional to an estimated arrival rate of new requests;
   (d) subtracting a variance proportional to an estimated arrival rate of express orders; and
   (e) scheduling the requests in accordance with delivery weight order.

30. A method according to claim 29 wherein said variance is calculated based on fuzzy logic.

31. A method according to claim 29 wherein said weights are updated as operating experience is gained.

* * * * *